(12) United States Patent
Hao et al.

(10) Patent No.: US 12,165,311 B2
(45) Date of Patent: Dec. 10, 2024

(54) UNSUPERVISED REPRESENTATION LEARNING AND ACTIVE LEARNING TO IMPROVE DATA EFFICIENCY

(71) Applicant: SAMSUNG SDS AMERICA, INC., San Jose, CA (US)

(72) Inventors: Heng Hao, San Jose, CA (US); Sima Didari, San Jose, CA (US); Jae Oh Woo, Fremont, CA (US); Hankyu Moon, San Ramon, CA (US); Patrick David Bangert, Sunnyvale, CA (US)

(73) Assignee: SAMSUNG SDS AMERICA, INC., San Jose, CA (US)

( * ) Notice: Subject to any disclaimer, the term of this patent is extended or adjusted under 35 U.S.C. 154(b) by 568 days.

(21) Appl. No.: 17/390,408

(22) Filed: Jul. 30, 2021

(65) Prior Publication Data

US 2022/0138935 A1 May 5, 2022

Related U.S. Application Data

(60) Provisional application No. 63/109,605, filed on Nov. 4, 2020.

(51) Int. Cl.
*G06F 18/2411* (2023.01)
*G06F 16/28* (2019.01)
(Continued)

(52) U.S. Cl.
CPC .......... *G06T 7/0012* (2013.01); *G06F 16/283* (2019.01); *G06F 16/55* (2019.01);
(Continued)

(58) Field of Classification Search
None
See application file for complete search history.

(56) References Cited

U.S. PATENT DOCUMENTS 11,182,415 B2 * 11/2021 Srirangamsridharan ................. G06F 16/313
11,526,752 B2 * 12/2022 Zhao ........................ G06N 3/08
(Continued)

FOREIGN PATENT DOCUMENTS

CA 3160566 A1 * 6/2021 ........... C12Q 1/6886
CA 3167694 A1 * 8/2021 ............. G06N 20/00

OTHER PUBLICATIONS

Wang et al., "COVID-NET: A Tailored Deep Convolutional Neural Network Design for Detection of COVID-19 Cases from Chest X-Ray Images," arXiv:2003.09871v4 (available at arxiv.org of Cornell University), May 11, 2020, (12 total pages).
(Continued)

*Primary Examiner* — Tsung Yin Tsai
(74) *Attorney, Agent, or Firm* — Sughrue Mion, PLLC

(57) ABSTRACT

A problem of imbalanced big data is solved by decoupling a classifier into a neural network for generation of representation vectors and into a classification model for operating on the representation vectors. The neural network and the classification model act as a mapper classifier. The neural network is trained with an unsupervised algorithm and the classification model is trained with a supervised active learning loop. An acquisition function is used in the supervised active learning loop to speed arrival at an accurate classification performance, improving data efficiency. The accuracy of the hybrid classifier is similar to or exceeds the accuracy of comparative classifiers in all aspects. In some embodiments, big data includes an imbalance of more than 10:1 in image classes. The hybrid classifier reduces labor and improves efficiency needed to arrive at an accurate classification performance, and improves recognition of previously-unrecognized images.

19 Claims, 19 Drawing Sheets

(51) Int. Cl.
  *G06F 16/55* (2019.01)
  *G06F 18/21* (2023.01)
  *G06F 18/214* (2023.01)
  *G06N 3/08* (2023.01)
  *G06T 7/00* (2017.01)

(52) U.S. Cl.
  CPC ........ *G06F 18/214* (2023.01); *G06F 18/2178* (2023.01); *G06F 18/2411* (2023.01); *G06N 3/08* (2013.01); *G06T 2207/20076* (2013.01); *G06T 2207/20081* (2013.01); *G06T 2207/20084* (2013.01); *G06T 2207/30041* (2013.01); *G06T 2207/30061* (2013.01)

(56) References Cited

U.S. PATENT DOCUMENTS

| | | | | |
|---|---|---|---|---|
| 11,730,387 B2* | 8/2023 | Bagci | ................... | A61B 8/481 |
| | | | | 705/2 |
| 2009/0062696 A1* | 3/2009 | Nathan | ................ | A61B 5/1101 |
| | | | | 600/595 |
| 2012/0316421 A1* | 12/2012 | Kumar | ............. | A61B 1/000096 |
| | | | | 600/407 |
| 2017/0196497 A1* | 7/2017 | Ray | .......................... | G06N 7/01 |
| 2018/0053057 A1* | 2/2018 | De Souza | ............. | G06V 20/41 |
| 2018/0165554 A1* | 6/2018 | Zhang | .................... | G06N 3/045 |
| 2019/0339687 A1* | 11/2019 | Cella | ...................... | G06Q 30/02 |
| 2020/0019618 A1* | 1/2020 | Srirangamsridharan | | .................... |
| | | | | G06F 16/313 |
| 2020/0082525 A1* | 3/2020 | Xu | ..................... | A61B 5/02042 |
| 2020/0160997 A1* | 5/2020 | Bagci | .................... | A61B 6/037 |
| 2020/0250527 A1* | 8/2020 | Zhao | ...................... | G06N 3/047 |
| 2021/0043216 A1* | 2/2021 | Wang | ...................... | G10L 17/18 |
| 2021/0334994 A1* | 10/2021 | Park | ........................ | G06T 7/593 |
| 2022/0035866 A1* | 2/2022 | Carrier | ............. | G06F 16/90332 |
| 2022/0138935 A1* | 5/2022 | Hao | ...................... | G06T 7/0012 |
| | | | | 382/128 |

OTHER PUBLICATIONS

Pang et al., "Unsupervised Contrastive Person Re-identification," Journal of LATEX Class Files, vol. 13, No. 8, Aug. 2015, (8 pages).

Sundararajan et al., "Predictive Approaches for Gaussian Process Classifier Model Selection," Sep. 10, 2008, arXiv:1206.6038v1 (available at arxiv.org of Cornell University), (21 pages).

Afshar et al., "COVID-CAPS: A Capsule Network-based Framework for Identification of COVID-19 cases from X-ray Images," arXiv:2004.002696v2 (available at arxiv.org of Cornell University), Apr. 16, 2020, (5 pages).

Kang et al., "Decoupling Representation and Classifier for Long-Tailed Recognition," ICLR, Feb. 19, 2020, arXiv:1910.09217v2 (available at arxiv.org of Cornell University)(16 pages).

* cited by examiner

| | First column | Second column | Third column | Example of row |
|---|---|---|---|---|
| | Data, e.g., Image | Label | Representation Vector (respresentation of data provided by 1-1, for example, a feature vector) | |
| First row | First X-Ray image (similar to 8-1, 8-2, or 8-3) | (normal, pneumonia, or covid-19) | Output of Neural network 1-1 (see FIG. 3A) | 3-1 (data) and 3-11 (representation vector), see FIG.3A |
| Second row | Second X-Ray image (similar to 8-1, 8-2, or 8-3) | 3-20 → No label | Output of Neural network 1-1 (see FIG. 3A) | 3-2 (data) and 3-12 (representation vector), see FIG. 3A |
| Third row | One of the "second X-ray images" but now with a label. | Label 4-10 (normal, pneumonia, or covid-19); labelled by oracle 4-11. | Output of Neural network 1-1 (see FIG. 3A)(already existing from Second row). | 3-23 (data) and 3-99 (representation vector), see FIG.3A. Also see FIG. 3B item 3-20. |

Examples of big data 1-10 and big data 1-100

(Nerthus folder 0)

(Nerthus folder 1)

(Nerthus folder 2)

(Nerthus folder 3)

UNSUPERVISED REPRESENTATION LEARNING AND ACTIVE LEARNING TO IMPROVE DATA EFFICIENCY

CROSS REFERENCE TO RELATED APPLICATION

This application claims benefit of priority of U.S. Provisional Application No. 63/109,605, filed Nov. 4, 2020, the contents of which are hereby incorporated by reference.

FIELD

The present disclosure is related to improving data efficiency using representation learning and active learning in the technology area of artificial intelligence (AI).

BACKGROUND

The present application relates to AI-based machines. AI-based machines are a result of training. The particular training data used for training an AI-based machine is critical. With different training data, practitioners are provided with a different AI-based machine.

SUMMARY

Provided herein is a mapper classifier system which decouples two step training and reduces labeling effort substantially.

A problem exists in training an AI-based machine when the training data is imbalanced. For example, training data is imbalanced if 90% of training data represents a well-known classification, and 10% or less of the training data represents a classification of important interest. Embodiments provided herein quickly provide an accurate AI-based machine even when the training data is imbalanced.

An example problem is as follows. A problem exists when developing technology to accurately diagnose a person when an epidemic related to a particular virus infection has begun and there is very limited medical data related to persons who have been infected with the particular virus infection.

An AI-based classifier may be used to process raw data and provide an estimate of whether the person from whom the raw data was taken has been infected with the particular virus infection.

Because there is very limited data related to the particular virus, a comparative AI-based classifier may have difficulty distinguishing an x-ray image associated with a healthy person, or an x-ray from a person with a different virus (e.g., pneumonia) from an x-ray of a person suffering from the particular virus infection.

As mentioned above, the training data for AI is critical. With different training data, practitioners are provided with a different AI machine. That is, the treatment of training data is a computer-centric problem; a first treatment of training data leads to a first AI machine, and a second treatment of training data leads to a second AI machine. The amount of computation time required and the accuracy of the first and second AI machines will generally depend on the treatment of training data.

The inventors of the present application have found that manipulating and/or filtering the training data leads more quickly to a better AI machine. For example, a performance goal is reached with less labelled training data than with comparative approaches.

In the present application, the particular structure of a two stage hybrid classifier is significantly influenced by addressing the problem of imbalanced data and unlabeled data (for example, low percentage of data for positive covid-19).

Embodiments provide a data-efficient hybrid classifier. Data shows that the embodiments achieve the state-of-the-art accuracy for covid-19 chest X-ray classification. Also, the problem-solving novel combination of representation learning and Gaussian process classifier (GP) is shown to be an effective solution for the issue of class imbalance, especially when facing data scarcity as in covid-19 case. Embodiments provide an efficient hybrid classifier with active learning. This is applied to the highly imbalanced covid-19 chest X-ray imaging area of technology, leading to saving about 90% of labeling time and cost.

A substantial decrease in labelling effort is obtained using active learning following unsupervised training. See the discussion below of FIGS. 4B and 9A. Embodiments start with a small amount of labeled data (initial training dataset) to train a classification model in active learning. Then, embodiments use an acquisition function to evaluate an unlabeled dataset and choose the most helpful samples for removing potential classifier confusion. These samples are labelled by an external oracle. The newly labeled data are then added to the training dataset to train an updated model with better performance. This process is repeated multiple times with the train set gradually increasing in size over time until the model performance reaches a particular stopping criterion. Active learning is especially applicable in the medical field where data collection and labeling are quite expensive.

Provided herein is a method of processing of big data by a hybrid classifier implemented on one or more processors, the method comprising training the hybrid classifier on the big data, wherein the training includes training a neural network, wherein the training comprises unsupervised representation learning, and training a classification model using active learning and a first plurality of representation vectors, wherein the first plurality of representation vectors is output by the neural network; obtaining a data image from a (e.g. lung-imaging) hardware apparatus; classifying, using the hybrid classifier, the data image to obtain a diagnosis; and sending the diagnosis to a display hardware device for evaluation by a physician.

An apparatus is also disclosed, the apparatus configured to perform the method. For example, provided herein is an apparatus configured to process big data, the apparatus comprising: one or more processors; a processor may be a CPU or GPU, for example, and one or more memories, the one or more memories storing instructions configured to cause the one or more processors to perform a method comprising: training the hybrid classifier on the big data, wherein the training includes: training a neural network, wherein the training comprises unsupervised representation learning, and training a classification model using active learning and a first plurality of representation vectors, wherein the first plurality of representation vectors is output by the neural network; obtaining a data image from a (e.g. lung-imaging) hardware apparatus; classifying, using the hybrid classifier, the data image to obtain a diagnosis; and sending the diagnosis to a display hardware device for evaluation by a physician.

A non-transitory computer readable medium (CRM) is also disclosed, the non-transitory CRM storing instructions, the instructions configured to cause one or more apparatuses to perform the method. For example, a CRM is disclosed, the non-transitory CRM storing instructions, the instructions configured to cause one or more apparatuses to perform a method comprising: training a hybrid classifier on big data, wherein the training includes: training a neural network, wherein the training comprises unsupervised representation learning, and training a classification model using active learning and a first plurality of representation vectors, wherein the first plurality of representation vectors is output by the neural network; obtaining a data image from a lung-imaging hardware apparatus; classifying, using the hybrid classifier, the data image to obtain a diagnosis; and sending the diagnosis to a display hardware device for evaluation by a physician.

BRIEF DESCRIPTION OF THE DRAWINGS

The text and figures are provided solely as examples to aid the reader in understanding the invention. They are not intended and are not to be construed as limiting the scope of this invention in any manner. Although certain embodiments and examples have been provided, it will be apparent to those skilled in the art based on the disclosures herein that changes in the embodiments and examples shown may be made without departing from the scope of embodiments provided herein.

FIG. 11 illustrates a data structure for labelled data, unlabeled data, and newly-labelled data, according to some embodiments.

DETAILED DESCRIPTION

Figure 1A:
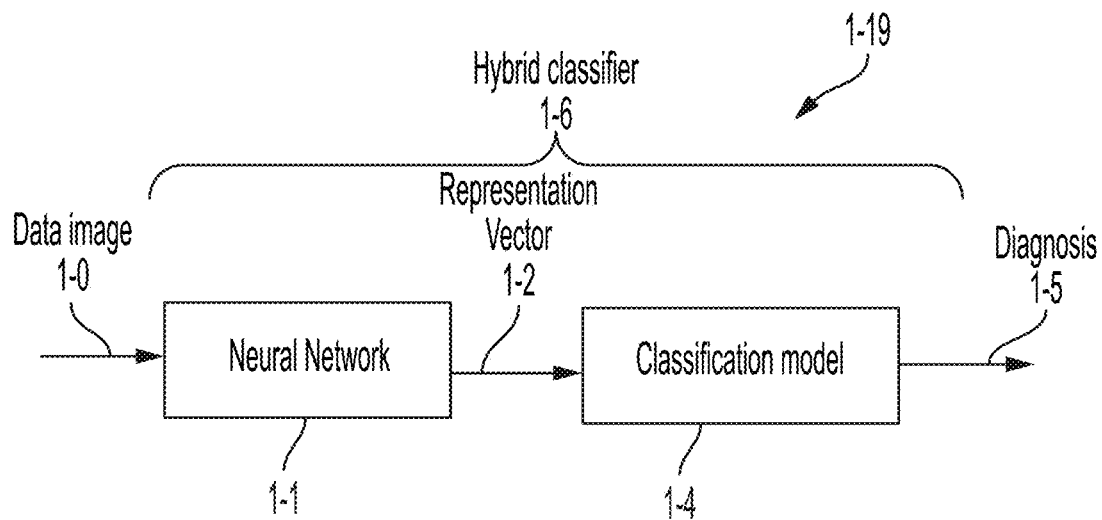
FIG. 1A illustrates an apparatus which is a hybrid classifier 1-6, according to some embodiments.

FIG. 1A illustrates a system 1-19 including a hybrid classifier 1-6 including a neural network 1-1 and a classification model 1-4. The input to the hybrid classifier 1-6 is a data image 1-0, for example, an x-ray image of a human person 1-9, according to some embodiments. The neural network 1-1 is efficiently trained using big data 1-10. The classification model 1-4 is initialized and then retrained using active learning 1-12. The structure of the big data 1-10 has a substantial effect on the neural network 1-10 and the classification model 1-4. Embodiments of the application cope with a problem of data imbalance 8-4 in the big data 1-10 (see FIG. 8) and quickly (see FIGS. 9A and 9B) provide an effective hybrid classifier 1-6. The neural network 1-1 outputs a representation vector 1-2, for example, a feature vector. The representation vector 1-2 is processed by the classification model 1-4 and produces the diagnosis 1-5.

Figure 1B:
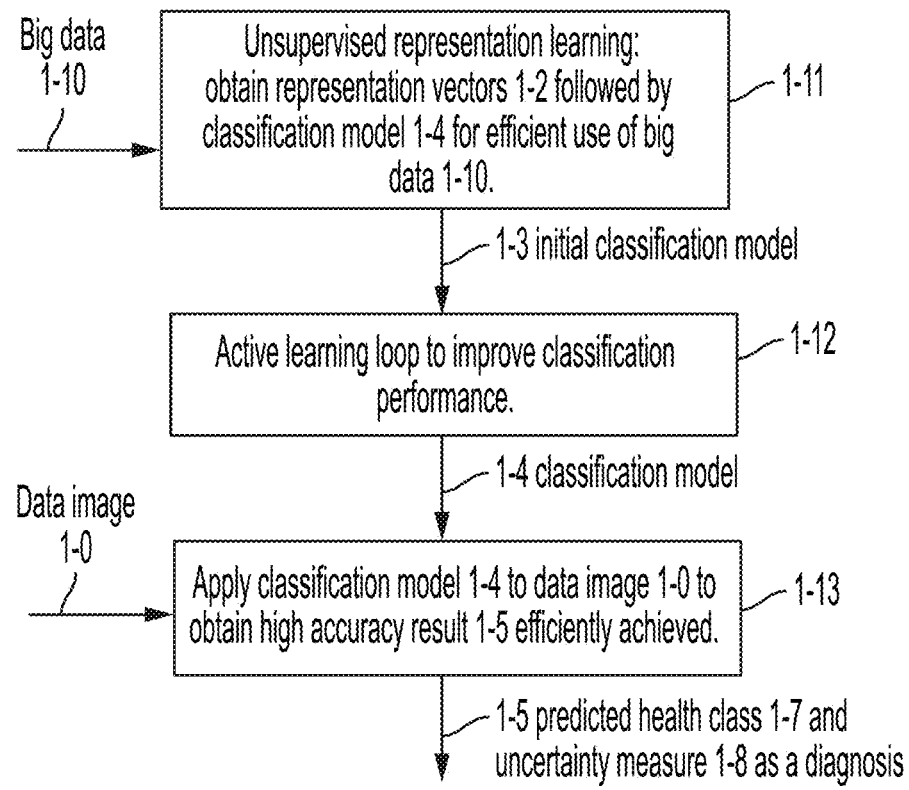
FIG. 1B illustrates a logic flow for efficiently training using active learning input of big data 1-10, according to some embodiments.

FIG. 1B illustrates a logic flow including operations 1-11, 1-12 and 1-13. At 1-11, representation vectors 1-2 are obtained from big data 1-10 and processed by the classification model 1-4 to produce an initial classification model 1-3. A data set with 1000 images or more is considered to be an example of big data. The expression "big data," is well known, see for example, J. Hensman, N. Fusi, and N. D. Lawrence, "Gaussian Processes for Big Data," arXiv: 1309.6835, http://arxiv.org/abs/1309.6835 (downloaded Apr. 26, 2020) ("the Big Data Paper").

At 1-12, an active learning loop is performed to update the initial classification model 1-3 to become classification model 1-4, and then to retrain classification model 1-4. Active learning identifies difficult-to-classify images. For example, images that lead to representation vectors 1-2 that appear to fit in either of two classifications. Such images are recognized by having a high uncertainty. Further description of active learning loop 1-12 is provided below in the description of FIG. 4A.

In FIG. 1B, at 1-13, the classification model 1-4 is used to process a data image 1-0. Operation 1-13 is not reached until the active learning loop 1-12 has reached a stopping condition, such as sufficient accuracy. At 1-13, then, training has been completed and a data image 1-0 is input which is to be classified. The diagnosis 1-5 is obtained. In an example, the diagnosis 1-5 includes a predicted health class 1-7, and an uncertainty measure 1-8. In an example, the predicted health class 1-7 is from the set {normal, pneumonia, covid-19}.

Figure 1C:
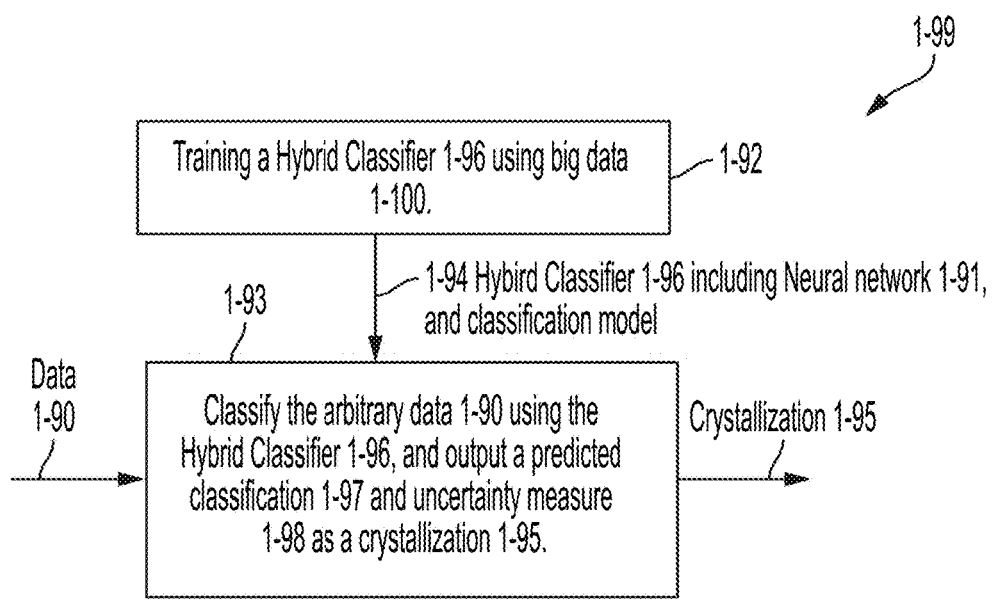
FIG. 1C illustrates training a hybrid classifier 1-96 and classifying data 1-90, according to some embodiments.

Applications of the solution of grappling with imbalanced big data are not limited to x-ray diagnosis. FIG. 1C illustrates a logic flow 1-99 including training a hybrid classifier 1-96 and classifying data 1-90, according to an alternative embodiment. The data 1-90 may be from applications including, as non-limiting examples, physics, neurobiology, signal processing, communications, robotic navigation, autonomous vehicles, tactile feedback and/or scene recognition. The data 1-90 is in general a data structure, such as a collection of parameters, a vector, a matrix, or a tensor. At 1-92, a hybrid classifier 1-96 is trained. This is similar to the training of hybrid classifier 1-6. As mentioned above, the data 1-90 is not limited to x-ray images. At 1-93, the data 1-90 is classified using the hybrid classifier 1-96. A predicted classification 1-97 is output and an uncertainty measure 1-98. The logic flow of FIG. 1C uses big data 1-100 and then arrives at a particular interpretation of the data 1-90, giving it a definite form. Thus classification 1-97 and uncertainty measure 1-98 may be referred to as a crystallization 1-95. Aspects of the other figures of the application (e.g., FIGS. 1A, 1B, 1D, etc.) are foreseen to be used in embodiments of logic flow 1-99 of FIG. 1C, including non-limiting examples of physics, neurobiology, signal processing, communications, robotic navigation, autonomous vehicles, tactile feedback and/or scene recognition. The crystallization 1-95 is of a type such as an inferred output from an AI-based machine.

Figure 1D:
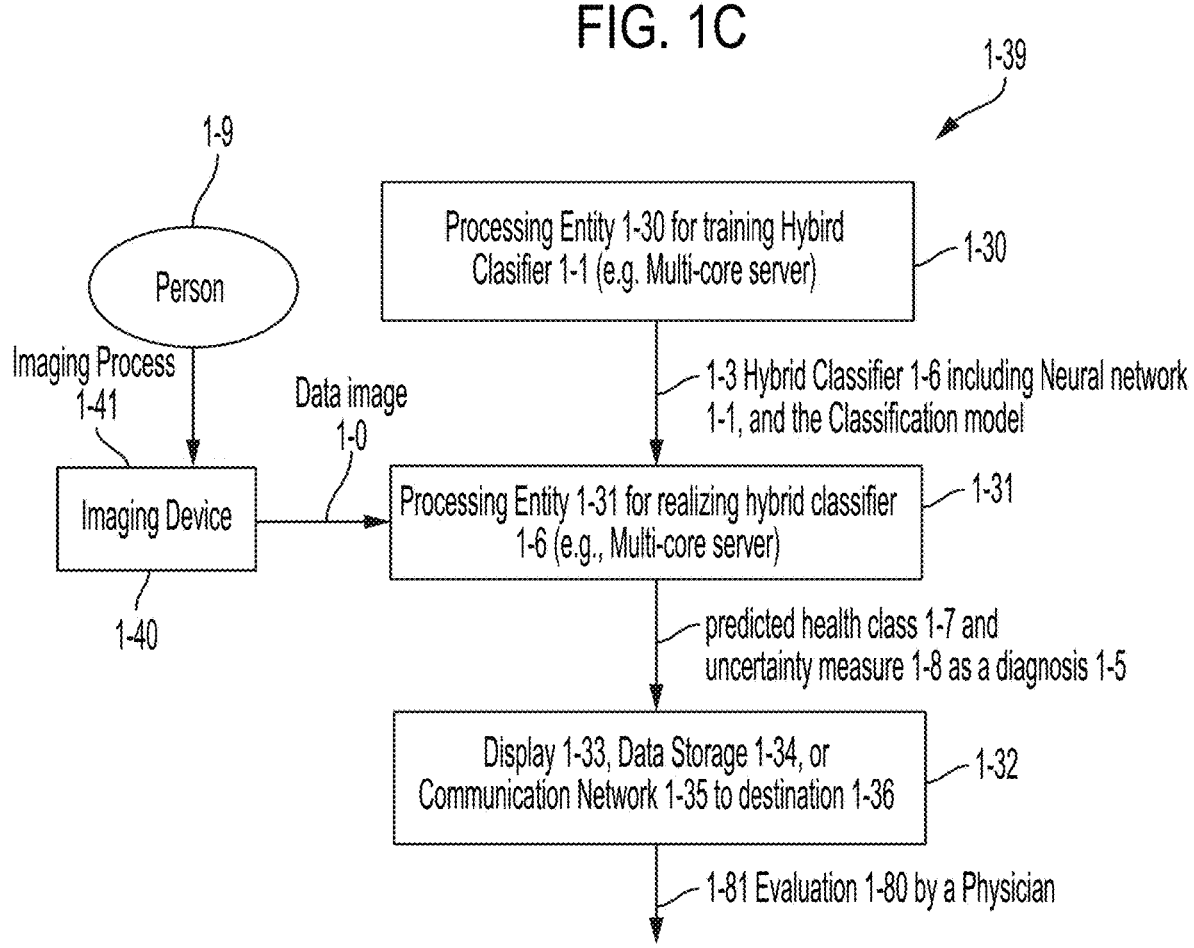
FIG. 1D is a system diagram illustrating a system 1-39 including an imaging device 1-40, a processing entity 1-30 for training, a processing entity 1-31 for realizing the hybrid classifier 1-6 and alternative output devices and apparatuses, according to some embodiments.

FIG. 1D is a system diagram illustrating a system 1-39 which is an example embodiment of system 1-19. System 1-39 includes an imaging device 1-40, a processing entity 1-30 for training, a processing entity 1-31 for realizing the hybrid classifier 1-6 and alternative output devices and apparatuses. The processing entity 1-30 may be a multi-core server, such as for example, a GPU server built for deep learning from Lambda Labs, Inc., of San Francisco, Calif., USA. GPUs of an example server may from AMD (Sunnyvale, Calif., USA), Intel (Santa Clara, Calif., USA), Nvidia (Santa Clara, Calif., USA), or Samsung (Seoul, Korea), for example. One or more non-transitory computer readable mediums (CRMs) store instructions for performance by the processing entities 1-30, 1-31 and operation of 1-33, 1-34 and 1-35.

An output of the processing entity 1-30 is the hybrid classifier 1-6 including the neural network 1-1 and the classification model 1-3. A processing entity 1-31, shown in FIG. 1D, then executes the neural network 1-1 and the classification model 1-4, processing the data image 1-0. The processing entity 1-31 may be the same or different than the processing entity 1-30.

The input to the processing entity 1-31 may be obtained from, for example, an imaging device 1-40 which captures an x-ray image (see for example FIG. 8), that is, data image 1-0, of the lungs of a person 1-9. The imaging device 1-40 may be an x-ray machine from, as non-limiting examples, GE Healthcare of Chicago, Ill., USA or Koninklijke Philips N.V. of Amsterdam, Netherlands.

The processing entity 1-31 provides a predicted health class 1-7 and uncertainty measure 1-8 as a diagnosis 1-5. These are then displayed on a display 1-33 for evaluation 1-80 by a physician 1-81. Alternatively, the diagnosis 1-5 is stored in a data storage 1-34 or transmitted by a communication network 1-35 to a destination 1-36. Some combination of these outputs are possible, such as the destination 1-36 being the location of the display 1-33, the data storage 1-34 and/or the physician 1-81. The communication network 1-35 may include applications such as email and websites. The communication network 1-35 may use wired and/or wireless interfaces.

Figure 1E:
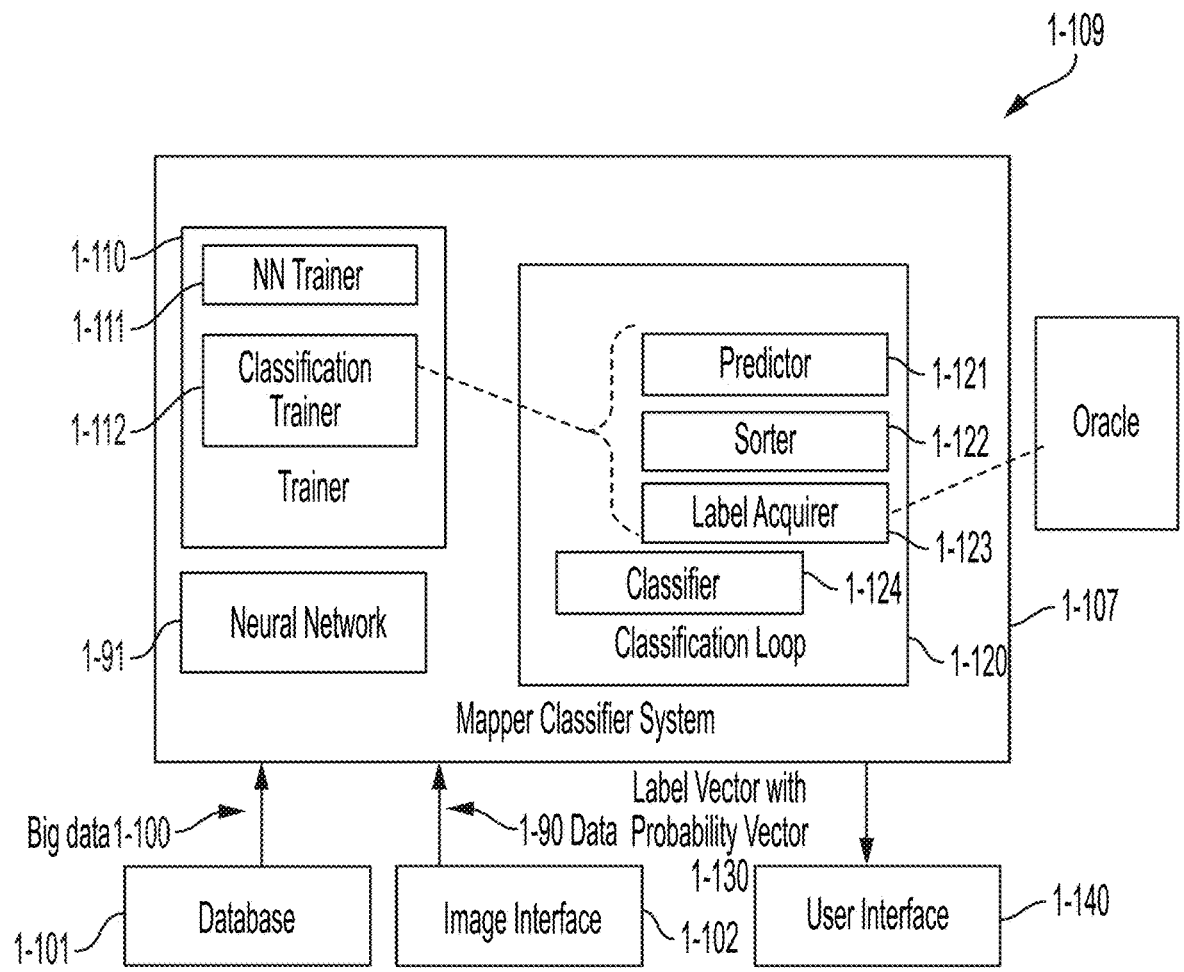
FIG. 1E is a block diagram of a mapper classifier system 1-107, according to some embodiments.

FIG. 1E is a block diagram illustrating a system 1-109. The system 1-109 includes a mapper classifier system 1-107, big data 1-100 input from a database 1-102, data 1-90 input from an image interface 1-102, and a label vector with probability vector 1-130 output to a user interface 1-140. The mapper classifier system 1-107 decouples two step training and reduces labeling effort.

The mapper classifier system 1-107 includes a trainer 1-110, a neural network 1-91 and a classification loop 1-120. The trainer 1-110 includes a neural network trainer 1-111 ("NN trainer 1-111") and a classification trainer 1-112. The classification loop 1-120 includes a predictor 1-121, a sorter 1-122 and a label acquirer 1-123.

Figure 4A:
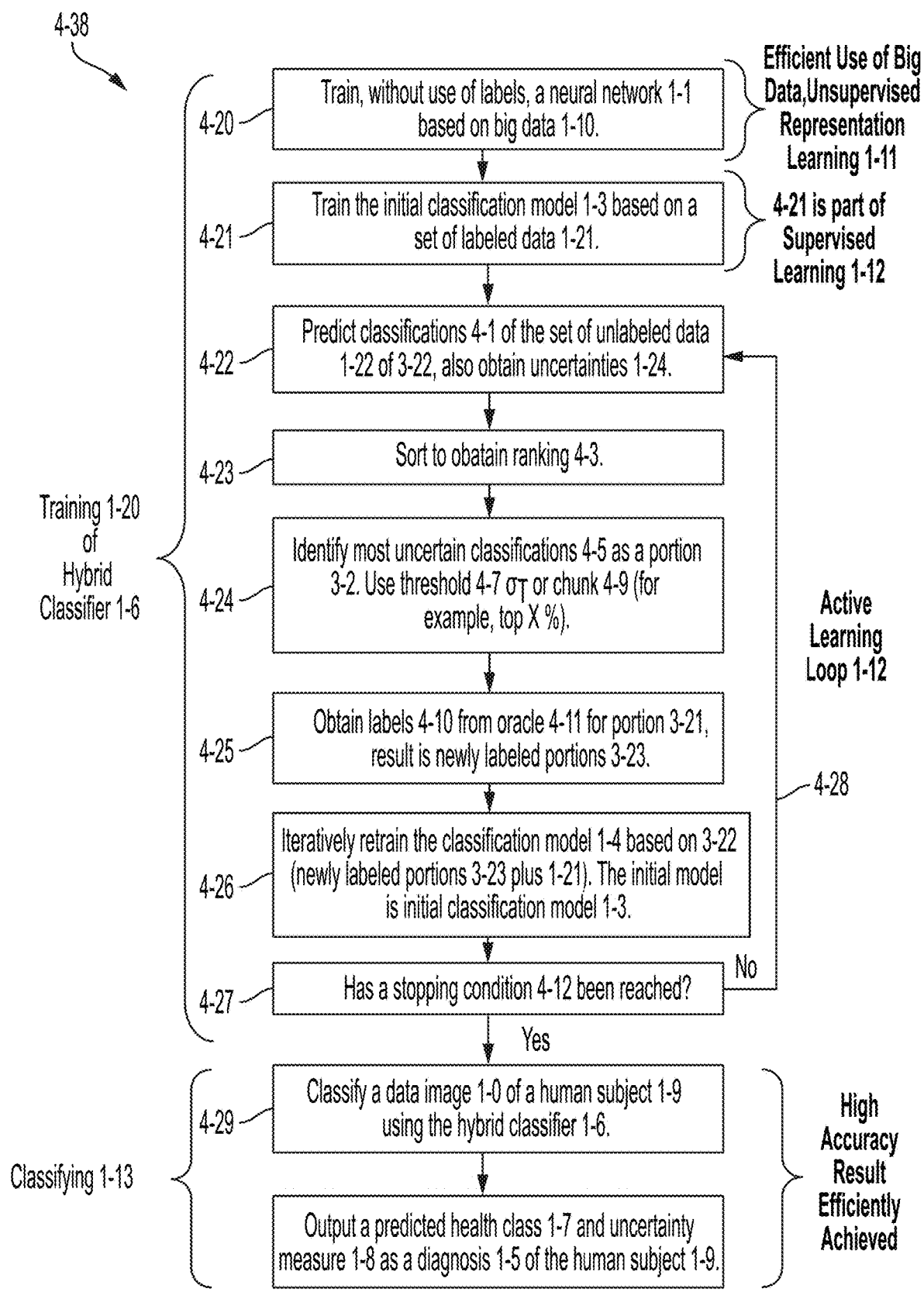
FIG. 4A is a logic flow illustrating efficient use of big data, an active learning loop, and a high accuracy result efficiently achieved, according to some embodiments.
Figure 4B:
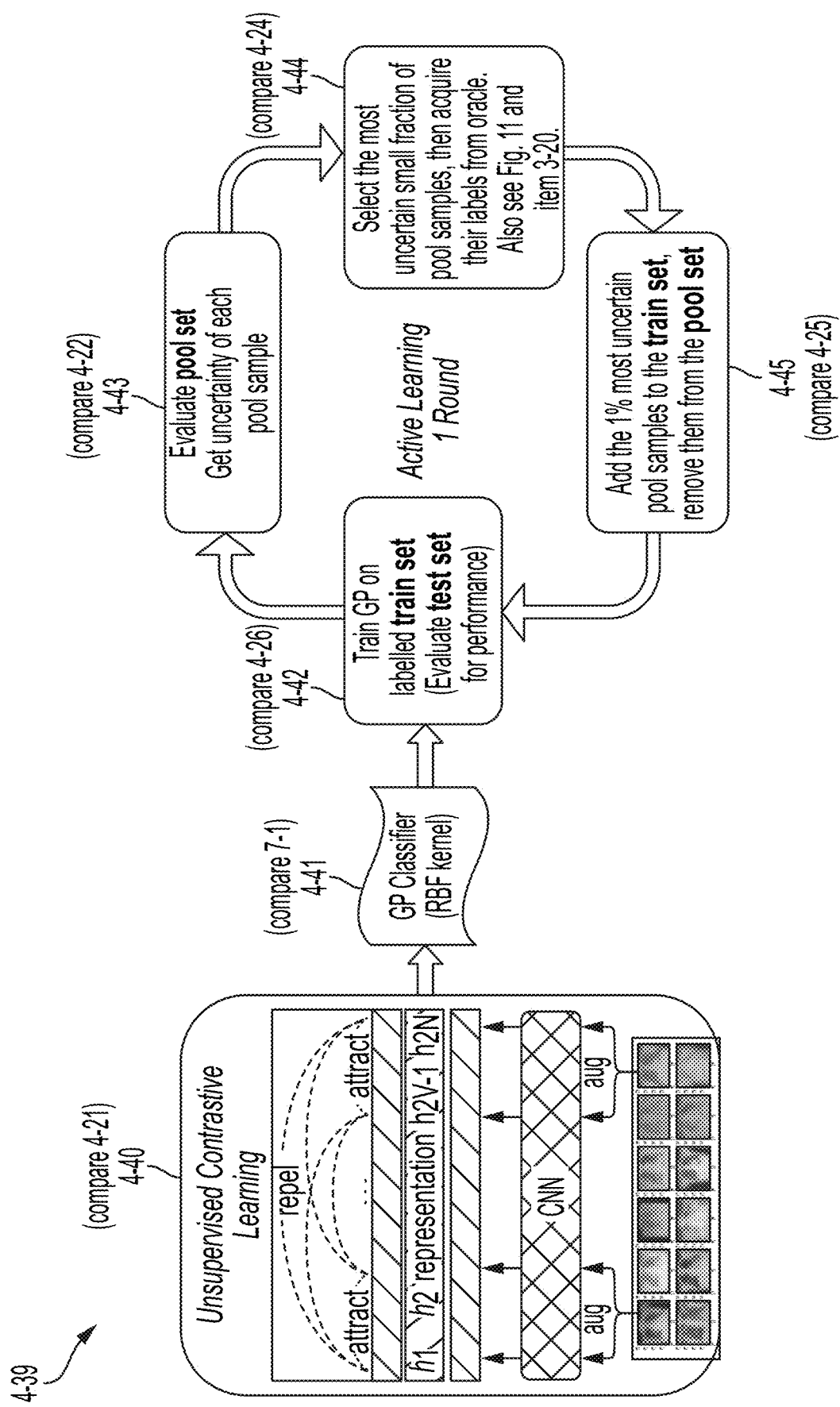
FIG. 4B is an instance of FIG. 4A using a GP model 7-1, according to some embodiments.

As an example, the NN trainer 1-111 may be realized by the logic of 4-20 and 4-21 of FIG. 4A and/or the SimCLR algorithm indicated in 4-40 of FIG. 4B. FIGS. 4A and 4B are discussed in detail below.

As an example, the classification trainer 1-112 may be realized by active learning loop 1-12 (see for example, FIG. 4A 4-22, 4-23, 4-24, 4-25, 4-26, 4-27, 4-28). The classification trainer 1-112 includes and controls the predictor 1-121 (also see 4-22), the sorter 1-122 (also see 4-23 and 4-24) and the label acquirer 1-12e (also see 4-25) of classification loop 1-120 (see the dashed lines in FIG. 1E).

An example of the image interface 1-102 are 1-40 and 1-41 of FIG. 1D. An example of user interface 1-140 is 1-32 of FIG. 1D. An example of a label vector with probability vector is the following set of three pairs {(category 1, probability 1), (category 2, probability 2), (category 3, probability 3)}. The set has the following meaning: the mapper classifier system 1-107 has determined that the data 1-90 belongs to the class of category 1 with probability 1, the data 1-90 belongs to the class of category 2 with probability 2, and the data 1-90 belongs to the class of category 3 with probability 3. Three classes are given as an example, and the mapper classifier system 1-107 is not limited to three classes.

Figure 1F:
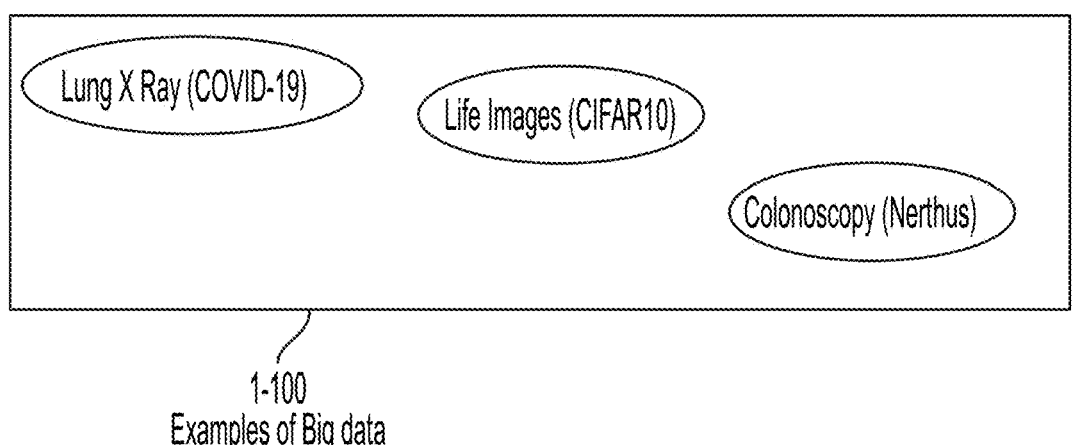
FIG. 1F is an example of technical applications of the mapper classifier system 1-107. The mapper classifier system 1-107 decouples two step training and saves a lot of labeling effort.
Figure 9A:
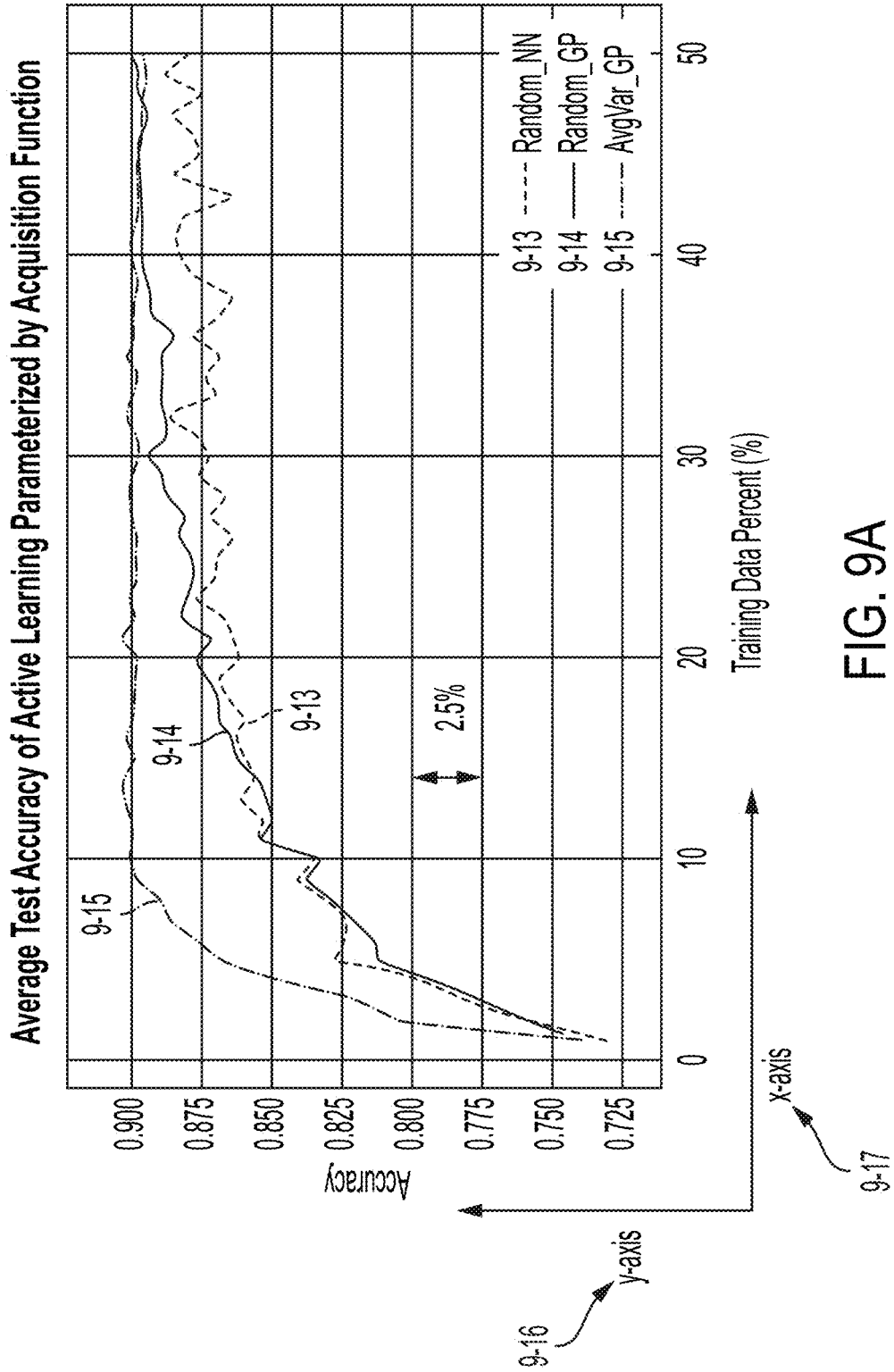
FIG. 9A illustrates average class test accuracy.
Figure 9B:
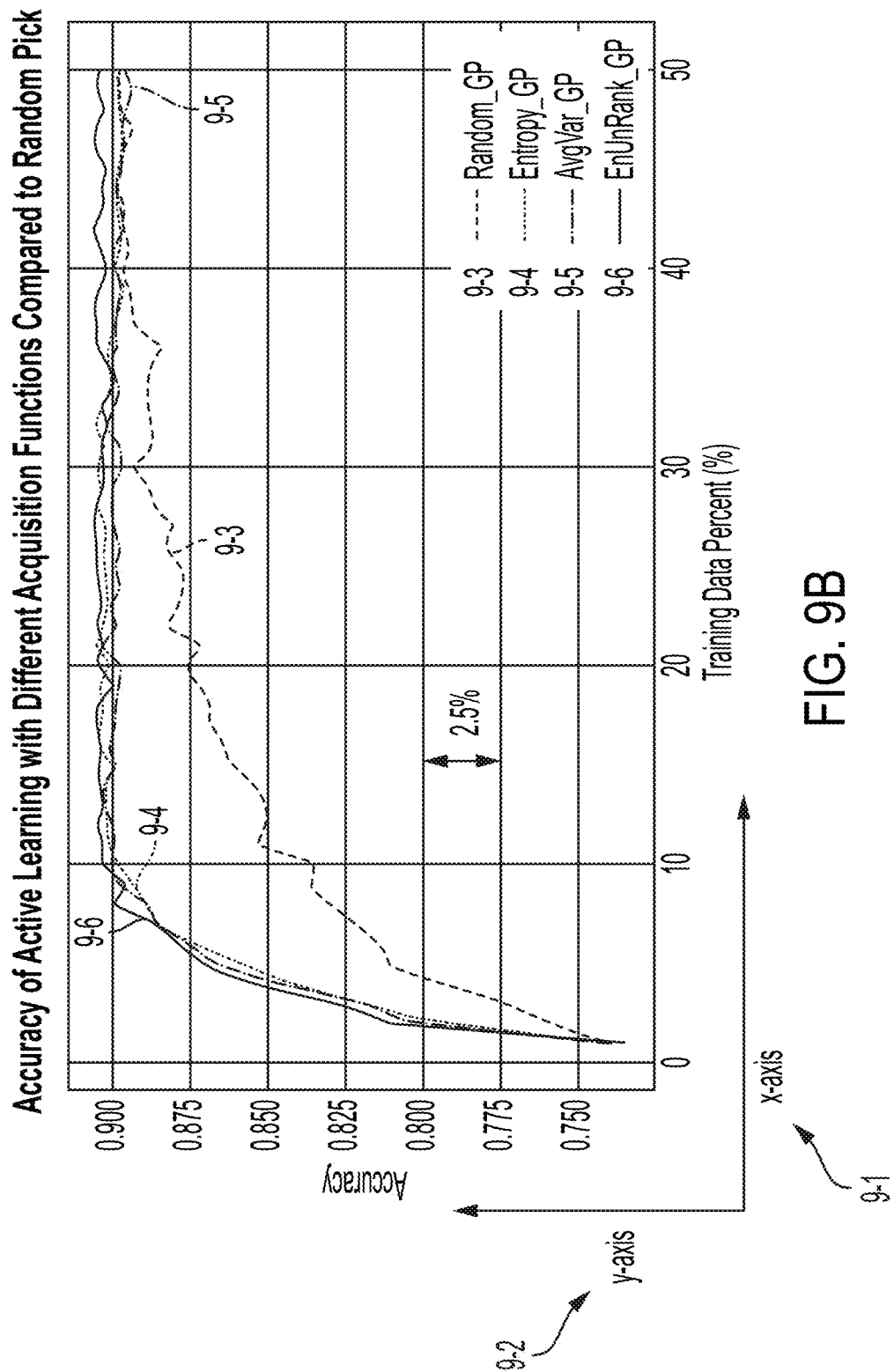
FIG. 9B illustrates improvement of accuracy with additional training data and comparison with a random benchmark. The benefit in rapid training of the decoupling of two step training is apparent.

FIG. 1F illustrates examples of big data 1-100 to which the mapper classifier 1-107 is applicable. The mapper classifier system 1-107 has been developed under these different datasets: Lung X Ray (COVID-19 data set), Life Images (CIFAR10 data set) and Colonoscopy (Nerthus data set). Performance results for the different mapper classifiers according to underlying dataset provided as big data 1-100 are shown in FIGS. 9A and 9B for covid-19, FIG. 13 for Nerthus (colonoscopy) and FIG. 14 for CIFAR10.

Figure 2A:
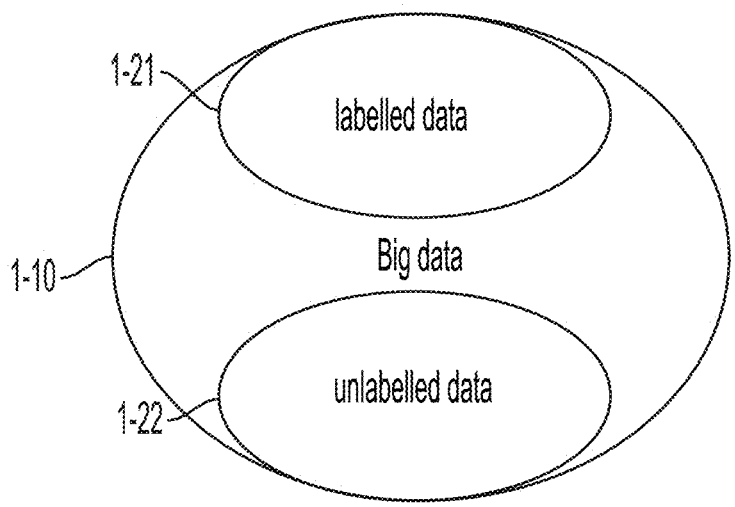
FIG. 2A illustrates big data 1-10 in which labelled data 1-21 is a subset and unlabeled data 1-22 is a subset, according to some embodiments.

FIG. 2A is a Venn Diagram illustrating big data 1-10 in which labelled data 1-21 is a subset and unlabeled data 1-22 is a subset.

Figure 2B:
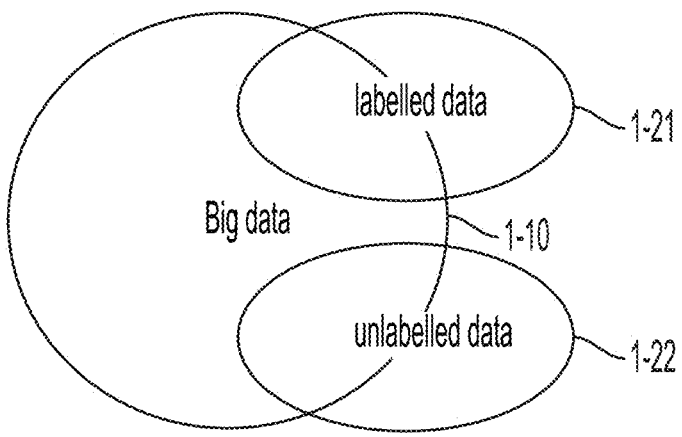
FIG. 2B illustrates labelled data 1-21 as partially within big data 1-10 and unlabeled data 1-22 as partially within big data 1-10, according to some embodiments.

FIG. 2B is also a Venn Diagram and illustrates labelled data 1-21 as partially within big data 1-10 and unlabeled data 1-22 as partially within big data 1-10.

Figure 2C:
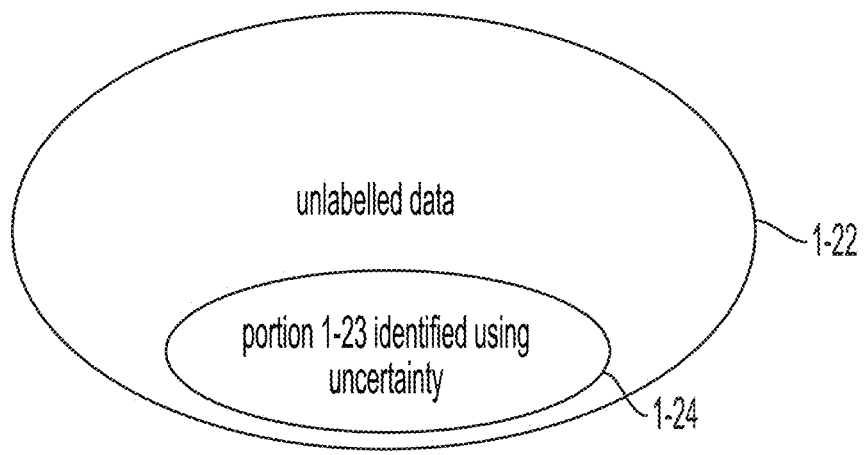
FIG. 2C illustrates unlabeled data 1-22, and a portion 1-23 identified using an uncertainty 1-24.

FIG. 2C, another Venn Diagram, illustrates unlabeled data 1-22, and portion 1-23 identified using an uncertainty 1-24. In some embodiments, active learning 1-12 changes the data-nature of a portion of the unlabeled data 1-22. For example, as described below with respect to FIG. 3B and the data structure 11-1 of FIG. 11, some portion 1-23 of unlabeled data 1-22 may be identified based on an uncertainty 1-24 as being difficult to classify.

FIGS. 2A, 2B, and 2C are non-limiting examples of data used with the mapper classifier system 1-107 of FIG. 1E.

Figure 3A:
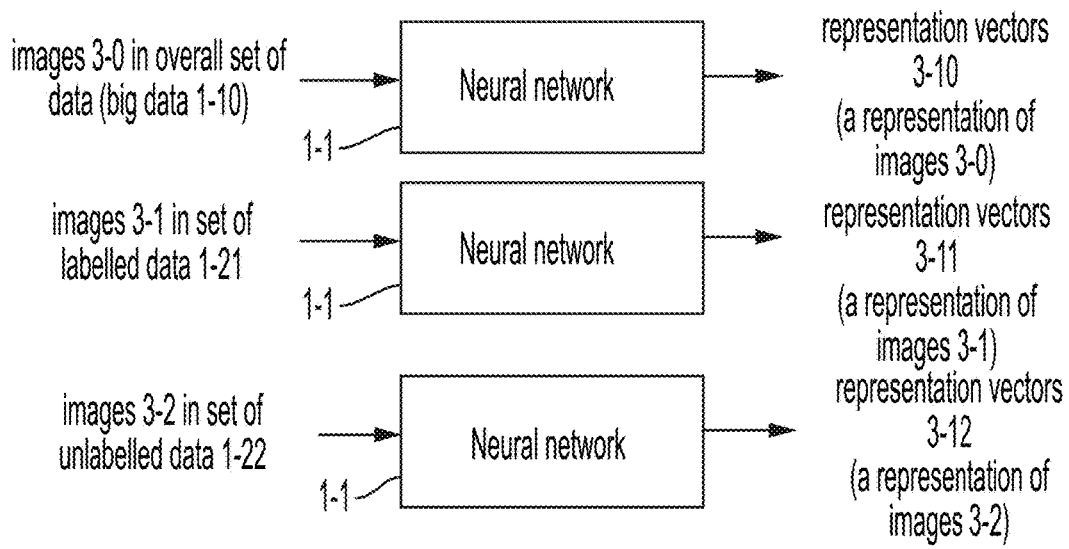
FIG. 3A illustrates representation vectors related to images by a neural network 1-1, according to some embodiments.

Embodiments of the application de-couple finding a representation for data from classifying the data. FIG. 3A illustrates finding representations. After the neural network 1-1 has been trained, there is a 1:1 correspondence between an image and its representation. The intention of FIG. 3A is to illustrate this 1:1 correspondence. Generally a reference to an image may refer to using the representation of the image. Also a classification of a representation is equivalent to a classification of the corresponding image. Also see FIG. 11 (first column holding an image identifier, index or database address corresponds, on a given row, to the third column, holding a representation identifier, index or database address).

Specifically, FIG. 3A illustrates images 3-0 in an overall set of data such as big data 1-10 being input to the neural network 1-1 and producing representation vectors 3-10, one representation for each one image. In general, a representation is a sequence of numbers and may be referred to as a representation or a representation vector.

Similarly images 3-1 in the set of labelled data 1-21 are processed by the neural network 1-1 to obtain representation vectors 3-11. Images 3-2 in the set of unlabelled data 1-22 are processed by the neural network 1-1 to obtain representation vectors 3-12.

Figure 3B:
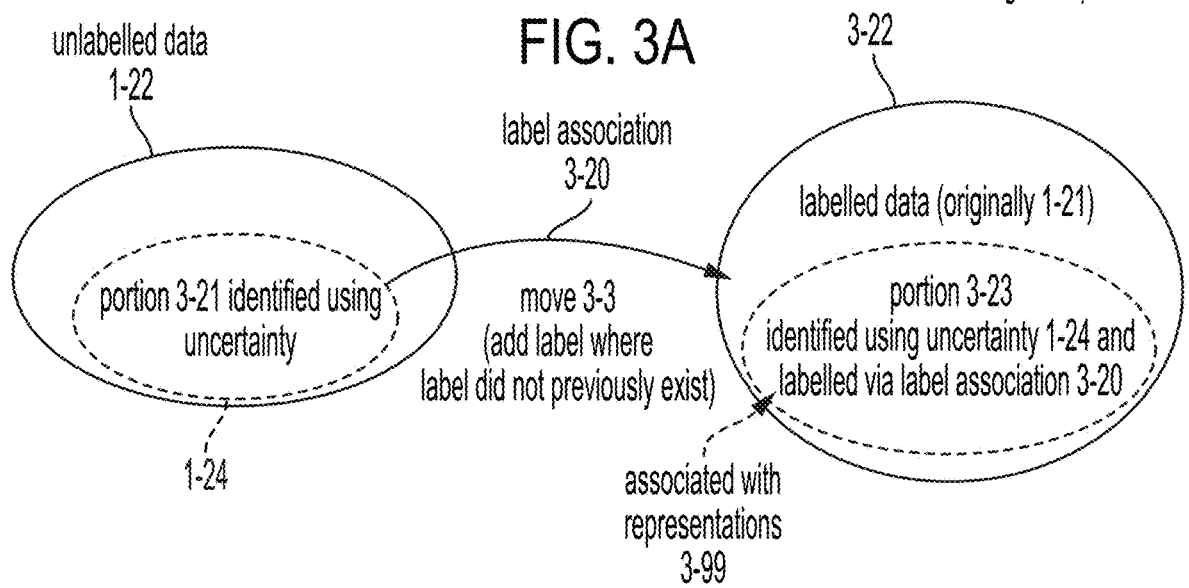
FIG. 3B illustrates a label association 3-20 used to attach labels to some previously unlabeled data, according to some embodiments.

A label association 3-20, an operation in active learning, is illustrated in FIG. 3B. A portion 3-21 of unlabeled data 1-22 is identified using the uncertainty 1-24 and moved, in a conceptual sense, to labelled data 3-22 (originally labelled data 1-21). This conceptual move is indicated as move 3-3 in FIG. 3B. In practice, the move 3-3 may be implemented by providing a label in a data structure, wherein a label did not previously exist. See FIG. 11.

Figure 3C:
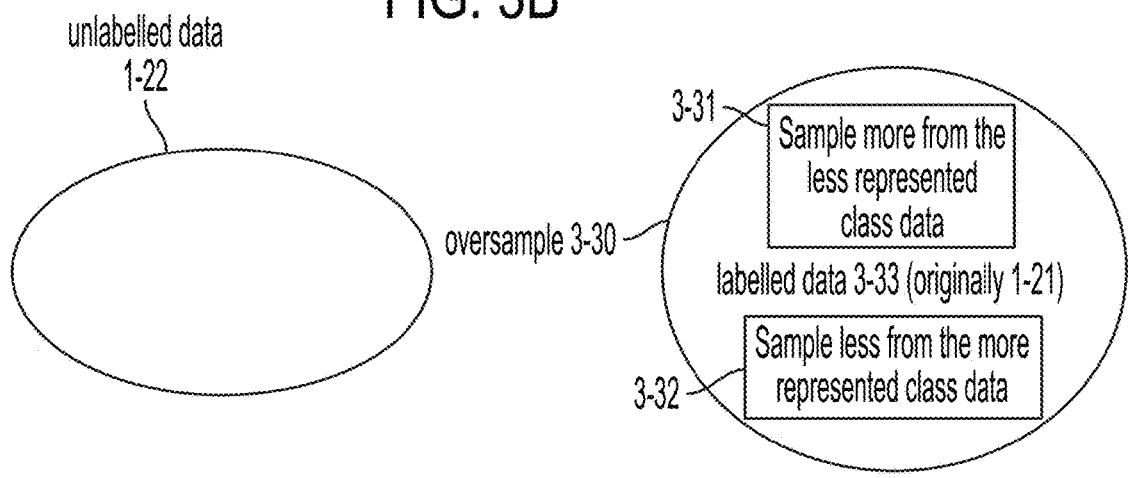
FIG. 3C illustrates a use of oversampling 3-30 to increase a percentage of under-represented data in a set of labelled data, according to some embodiments.

A problem addressed by the present application is an imbalance 8-4 in big data 1-10. The problem is addressed, in some embodiments, by performing oversampling 3-30 within the labelled data 1-21, see FIG. 3C. For example, a fraction of the covid-19 labelled x-ray images may be duplicated within the labelled data to produce a new set of labelled data, data 3-33. The total number of labelled images does not change. FIG. 3C as indicated by the item over-sample 3-30, illustrates sampling more from less represented class data (item 3-31) and sampling less from the more represented class data (item 3-32). As one example, then, the covid-19 data images increase by a number of A images (3-31) and the number of non-covid-19 cases (normal and pneumonia) data images decrease by the same number of A images (3-32).

FIGS. 3A, 3B and 3C are non-limiting examples of data operations used with the mapper classifier system 1-107 of FIG. 1E.

FIG. 4A is a logic flow for efficient use of big data 1-10 in unsupervised representation learning 1-11, the active learning loop 1-12. A high accuracy result 1-5 is efficiently achieved.

At operation 4-20, the neural network 1-1 is trained.

As an example, 4-20 can be performed by starting with a mini-batch with N image samples, applying image augmentation twice to generate 2N samples. Image augmentation can include five operations: random crop, random flip, color distortion, Gaussian blur, and random gray-scale.

To define a contrastive loss, two types of augmented samples are distinguished. One type is a positive pair of samples, and the other is a negative pair of samples. Positive pairs are the ones augmented from the same image. For any other case, embodiments consider those pairs to be negative pairs of samples regardless of the labels. The labels are unknown or treated as unknown in training of the neural network 1-1 (thus "unsupervised learning").

A SimCLR method is used, in some embodiments. As a general example applying SimCLR, see B. Pang, D. Zhai, J. Jiang and X. Liu, "Fully Unsupervised Person Re-identification via Selective Contrastive Learning," arXiv: 2010.07608; downloaded Apr. 26, 2021 ("the SimCLR Paper").

The SimCLR approach maximizes a similarity of the positive pair, using a contrastive loss. The contrastive loss between a pair of samples of i and j is given by $$l_{i,j} = -\frac{sim(z_i, z_j)}{\tau} + \log \sum_{k=1}^{2N} 1_{k \neq j} \exp(sim(z_i, z_j))/\tau) \qquad \text{Eq. 1}$$

The notation $1_{k \neq j}$ means the multiplying term is 1 if k is not equal to j, otherwise the multiplying term is 0. Sim(',') is the cosine similarity between two vectors, and $\tau$ is a temperature hyperparameter. In the SimCLR method, the contrastive loss is evaluated at the projection head layer after a ResNet-50 backbone. See, for example, Ting Chen, Simon Kornblith, Kevin Swersky, Mohammad Norouzi, and Geoffrey E. Hinton, "Big self-supervised models are strong semi-supervised learners,", https://arxiv.org/abs/2006.10029, downloaded Apr. 26, 2021 ("the Big Model Paper").

The representation vectors 3-11 (unlabelled) and 3-12 (labelled) are then found. See FIG. 3A. Also see the "First row" and "Second row" of FIG. 11. In an example, there are 2,048 dimensions in the representation vector 1-2 corresponding to one input image.

At 4-21 of FIG. 4A, the initial classification model 1-3 is trained based on a set of labelled data 1-21.

In one embodiment, the initial classification model 1-3 is a Gaussian Process model 7-1, also referred to as a GP model or GP classifier. To train the GP model, some embodiments use the Sparse Variational GP (SVGP) algorithm (see the Big Data Paper).

With respect to training the initial classification model, some embodiments choose the RBF (radial basis function) kernel with 128 inducing points. Some embodiments train the initial classification model 1-3 for 24 epochs using an Adam optimizer with a learning rate of 0.001. For an example of an Adam optimizer, please see Diederik P. Kingma, Jimmy Ba "Adam: A Method for Stochastic Optimization" ICML 2015, arxiv: 1412.6980 (the "Adam Optimizer Paper.").

After the initial classification model 1-3 is obtained at 4-21, the active learning loop 1-12 of operations 4-22 through 4-27 is performed repeatedly as a loop or round.

Some embodiments use a covid-19 train set including 13,942 samples as the labelled data 1-21 (also referred to as a train set) and a subset which is sampled from 1-22 for determining uncertainty (also referred to as a pool set).

For example, some embodiments first randomly select 140 samples (about 1%) as the initial train set for active learning. See Table 1 below. Embodiments train the GP model 7-1 using the representations 1-2 of the train set with labels from 1-21.

Performance of the GP model 7-1 can be evaluated as follows. The trained GP model 7-1 (an instance of the initial classification model 1-3) is used to evaluate a subset of the labelled data 1-21; the subset may be referred to as a test set. Since ground truth labels are known for the labelled data 1-21, embodiments are then able to calculate the accuracy and confusion metrics to measure the performance of the trained GP model.

TABLE 1

|  | Normal | Pneumonia | covid-19 |
|---|---|---|---|
| Train (FIG. 4 item 4-21) | 7,966 | 5,469 | 507 |
| Test (FIG. 4 item 4-22) | 885 | 594 | 100 |

The same GP model 7-1 can then be used to evaluate the pool data and calculate prediction probabilities and uncertainties. Examples of prediction probabilities are false positives, false negatives ("miss"), true positives ("recall"), and true negatives. These prediction probabilities are entries in a confusion matrix. Accuracy may be expressed at the sum of true positives and true negatives divided by the number of the total population input to a classifier.

To select the most informative samples from the pool, various acquisition functions have been developed. As an example, entropy may be used. Some examples of using acquisition functions are described in Yarin Gal and Zoubin Ghahramani, "Dropout as a bayesian approximation: Representing model uncertainty in deep learning," Proceedings of The 33rd International Conference on Machine Learning, pages 1050-1059, 2016; URL: https://arxiv.org/abs/1506.02142, downloaded on Apr. 27, 2021 ("the Acquisition Function Usage Example Paper").

Entropy is the uncertainty based on average class variance and the combination of both. Firstly, embodiments compare the entropy of the pool samples.

$$H(p) = -\Sigma_c p(c) \log p(c) \quad \text{Eq. 2}$$

c is a class index.

With the trained mapper classifier system 1-107, embodiments can predict each image in the pool set, the class probability, in a non-limiting example of for example in a covid-19 application of the mapper classifier system 1-107, there are 3 classes, "normal", "pneumonia" and "covid-19", the output of the classifier of each model is a vector, showing the probability of these 3 classes, eg [0.8, 0.1, 0.1]. In FIG. 1E, this set of data is referred to as a label vector with probability vector 1-130.

Secondly, embodiments compare the prediction uncertainties of the pooled samples. For each sample, the GP model 7-1 will provide the posterior variance of the prediction of each class. Embodiments calculate an average class variance, and consider the estimate to be the uncertainty 1-24 of the pooled sample. Lastly, considering both the entropy and the average class variance uncertainty, the sample's entropy rank and the average class variance rank are obtained. Embodiments add the two rank numbers together as a combined rank for each pooled sample. A most uncertain set corresponding to a largest chunk of X % of the highest uncertainties may be selected to be labelled. For example, the approximately 1% pooled samples with the largest entropy, average class variance or combined ranking 4-3 are selected to be labeled and added to the train set for the next round of the active learning loop 1-12. These samples form the most uncertain classifications 4-5 and are a portion 3-21 of the unlabelled data 1-22. As an alternative, those pool entries with a combined rank in excess of a threshold $\sigma_T$ may be selected for labelling. The threshold $\sigma_T$ may be, for example, a value such as four times the square root of the average class variance. However, using sample number is preferred rather than using a threshold such as $\sigma_T$, because it is hard to control identifying pool entries using a threshold such as $\sigma_T$. It is easier, for example, to only label the top 100, top 1/%, etc. Sample number is easier to control.

Labels 4-10 may be obtained from an oracle 4-11 for the portion 3-21, providing a result of a newly labelled portion 3-23.

A stopping condition 4-12 may then be checked, such as a satisfactory accuracy level. If the stopping condition 4-12 is not satisfied, another round is performed by looping back to 4-22.

If the stopping condition 4-12 is satisfied, then the GP model 7-1, an instance of the classification model 1-4 is then fully trained. The hybrid classifier consisting of neural network 1-1 and classification model 1-4 is then ready for use.

In FIG. 4A, 4-29 is the logical operation of using the hybrid classifier 1-6 to classify a data image 1-0 of a human subject 1-9. The output is a predicted health class 1-7 and uncertainty measure 1-8 as a diagnosis 1-5 of the human subject 1-9. By using the approach described above for imbalanced data with unsupervised representation learning 1-11 decoupled from active learning loop 1-12, the hybrid classifier 1-6 is quickly obtained and also performs with good accuracy. The two parts are trained separately this is the meaning of decoupling. The benefit of the decoupling is embodiments also use useful information of the unlabeled data in the unsupervised part. This benefit would not be obtained the two parts are not decoupled.

FIG. 4B illustrates a logic flow 4-39 which is an embodiment of the logical flow 4-38 of FIG. 4A. FIG. 4B is labelled for easy comparison with logic operations in FIG. 4A.

At 4-40, a GP classifier is produced by 4-40 using contrastive learning (one non-limiting example is SimCLR). The underlying neural network structure is generally a convolutional neural network (CNN). One non-limiting example is ResNet-50. For further details of the ResNet-50 example, see the Big Model Paper.

At 4-42, the GP model 7-1 is trained using a labelled train set. At 4-43 a pool set is evaluated and uncertainty is obtained for each pool sample.

At 4-44 of logic flow 4-39, a small fraction F of the pool samples are selected. As a non-limiting example, the small fraction F may be 1%. Thus, the fraction F of most uncertain pool samples are selected and their labels are obtained.

At 4-45, after the newly labelled data is obtained, it is joined (set union operator) to the train set. Also see 3-21 of FIG. 3B.

A next iteration (or round) then begins at 4-42 with retraining the GP model 7-1.

The rounds continue until a stopping condition is reached, see FIG. 4A 4-27.

FIG. 4A is one example logic flow for the mapper classifier 1-107 of FIG. 1E. FIG. 4B is another example logic flow for the mapper classifier 1-107 of FIG. 1E.

Overall, embodiments provide a mapper classifier system with an image interface able to process big data to quickly train a neural network and a classifier. In the public domain large sets of images may be available, but the large set of images may not be labelled in a meaningful way for the problem to be solved in a time efficient manner. Embodiments of the present application address this problem to provide the mapper classifier system, which is a kind of AI machine. The neural network is trained in an unsupervised manner, drastically reducing labor effort. In some embodiments, the mapper classifier system includes a trainer, a neural network and a classification loop. The trainer includes a neural network trainer and a classification trainer. The classification loop includes a predictor, see FIG. 1E 1-121, a sorter, see FIG. 1E 1-22 and a label acquirer. The classification loop performs classifications and detects areas of the classification space where uncertainty is high. The performance in these areas is then improved using, for example, the label acquirer, see FIG. 1E 1-124.

After making use of the available data set which does not have ideal labelling, the mapper classifier system is ready for use. The neural network and the classifier, for example, see FIG. 1E, efficiently process and classify a data image from the image interface. For some embodiments, the classifier outputs a classification of the data image as a label vector with probability vector output to a user interface, see FIG. 1E 1-130.

As a non-limiting example of application of the mapper classifier 1-107 of FIG. 1E, a Nerthus (related to bowel cleansing and preparation for colonoscopy, endoscopic examination of the bowel) dataset has been used as an example of big data. Nerthus is a large open access benchmark dataset. A URL for the dataset is as follows. https:// datasets.simula.no/nerthus/ The Nerthus URL also refers to the following paper.

Konstantin Pogorelov, Kristin Ranheim Randel, Thomas de Lange, Sigrun Losada Eskeland, Carsten Griwodz, Dag Johansen, Concetto Spampinato, Mario Taschwer, Mathias Lux, Peter Thelin Schmidt, Michael Riegler, Pal Halvorsen, Nerthus: A Bowel Preparation Quality Video Dataset, In MMSys'17 Proceedings of the 8th ACM on Multimedia Systems Conference, Pages 170-174, Taipei, Taiwan, Jun. 20-23, 2017.

The Nerthus data set, according to the URL, consists of about 5,000 image frames. A sample of these types of bowel images is shown in FIGS. 12A, 12B, 12C and 12D.

The mapper classifier 1-107 of FIG. 1E has been used on the Nerthus data set.

Figure 13:
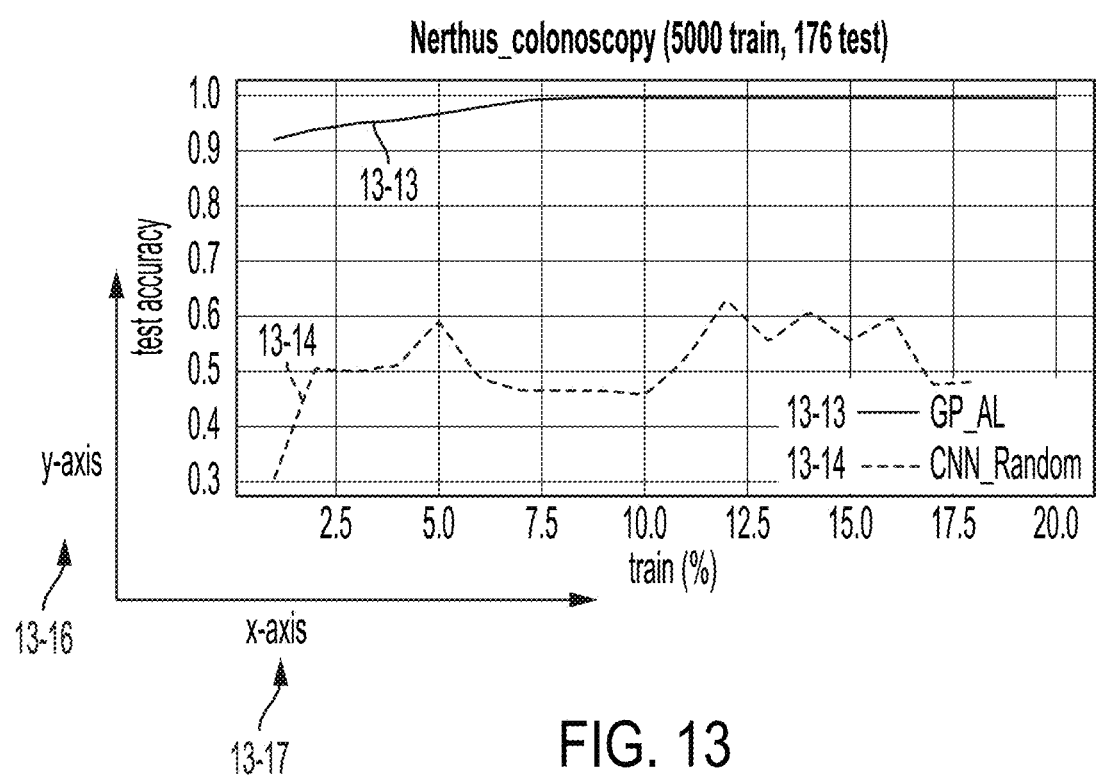
FIG. 13 illustrates performance of an embodiment for colonoscopy data set of images.

To test speed in training, embodiments were tested against a convolutional neural network (CNN) classifier with random selection of samples for labelling (as opposed to the active learning ("AL") label acquisition of the predictor, sorter and label acquirer of FIG. 1E). The results are shown in FIG. 13 with x-axis 13-17 indicating progress into training time and y-axis 13-16 indicating test accuracy. Reaching a high value further to the left in the figure is better. Embodiments, curve 13-13, perform much better than the CNN comparison benchmark, curve 13-14.

Figure 14:
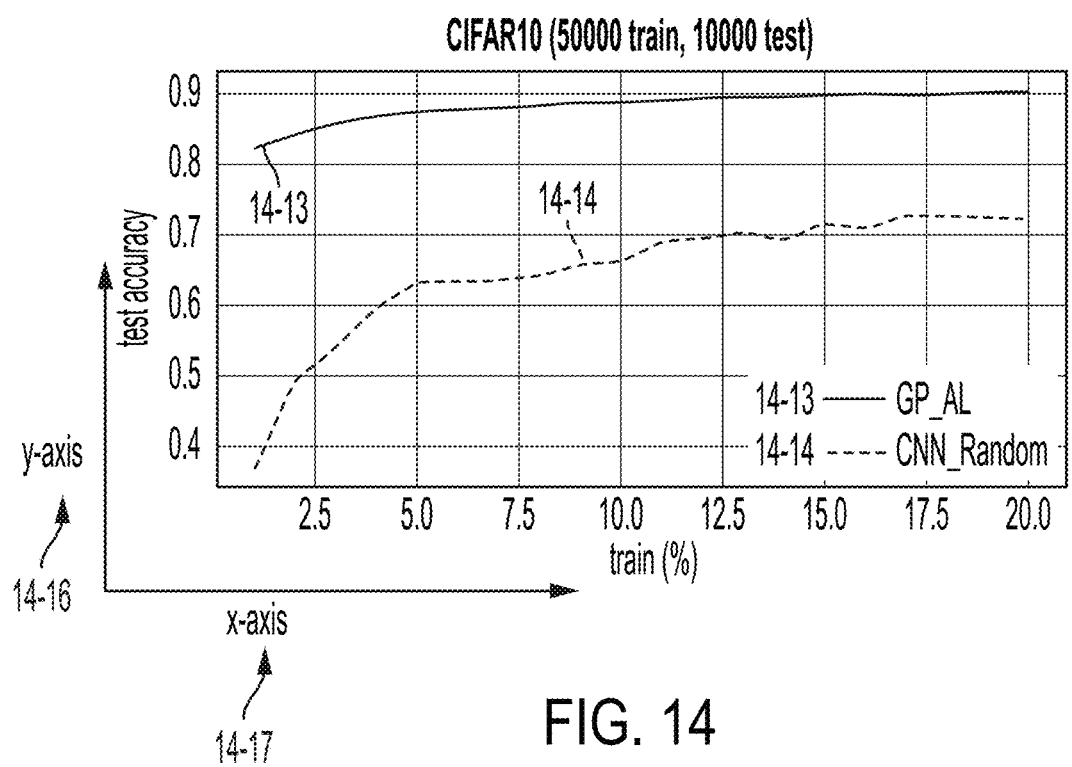
FIG. 14 illustrates performance of an embodiment for a OFAR10 data set of images.

As yet another non-limiting example of the mapper classifier 1-107 of FIG. 1E, a CIFAR10 dataset has been used as the big data 1-100 of FIG. 1E. The CIFAR10 dataset is available at this URL. https://www.cs.toronto.edu/~kriz/cifar.html This URL also refers to the following report. "Learning Multiple Layers of Features from Tiny Images," Alex Krizhevsky, 2009. As seen from data at the URL, CIFAR10 provides a large database of images of such things as associated with identification of objects such as airplanes, automobiles, birds, cats, deer, dogs, frogs, horses, ships or trucks, as an example. Rapid convergence of embodiments is shown by the curve 14-13 in FIG. 14 and is superior to the benchmark CNN shown by curve 14-14. In FIG. 14, x-axis 14-17 indicates progress into training time and y-axis 14-16 indicates test accuracy.

Figure 8:
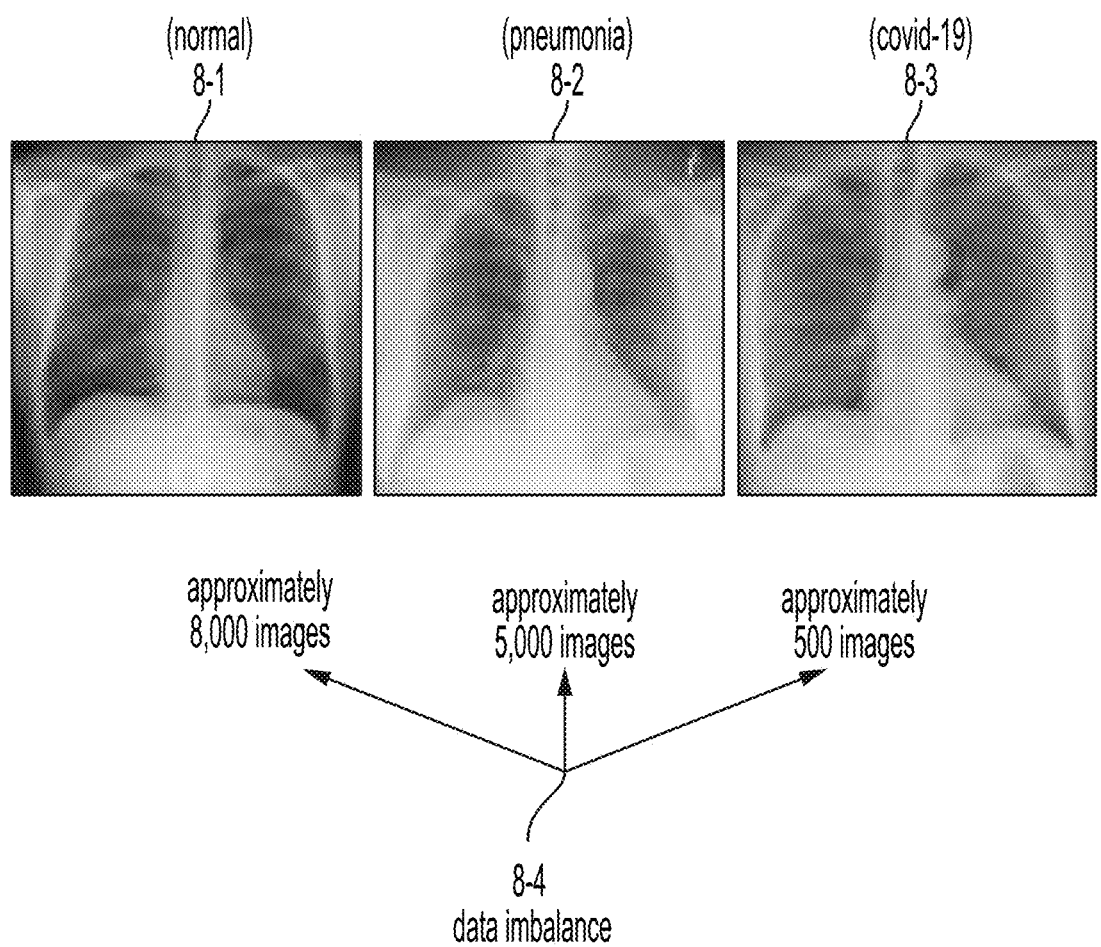
FIG. 8 illustrates examples of big data 1-10 and illustrates data imbalance 8-4.

As another non-limiting example of application of the mapper classifier 1-107 of FIG. 1E, a COVIDx dataset has been used as an example of big data. COVIDx is a large open access benchmark dataset in terms of the number of covid-19 positive patient cases. At the time of this work, it consisted of 15,521 chest X-ray images, of which 8,851 are "Normal", 6,063 "Pneumonia" and 601 "COVID-19" pneumonia cases. A sample of these three types of X-ray images is shown in FIG. 8.

In a non-limiting example, an imbalanced data set, also referred to as COVIDx herein, is generated from the combination and modification of five different publicly available data repositories. These datasets are as follows: (1) COVID-19 Image Data Collection, (2) COVID-19 Chest X-ray dataset Initiative (3) ActualMed COVID-19 Chest X-ray dataset Initiative (4) RSNA Pneumonia Detection Challenge dataset, which is a collection of publicly available X-rays, and (5) COVID-19 radiography database.

COVIDx is an imbalanced dataset with much fewer covid-19 positive cases than other conditions. About 4% of the whole COVIDx images are covid-19 positive cases. The train and test splits of the COVIDx dataset are depicted in Table 1. The class ratio of the three classes ("Normal", "Pneumonia", and "covid-19") for the train set is about 16:11:1 and for the test set is about 9:6:1.

Before feeding data to neural network 1-1, some embodiments pre-process the images by performing a 15% top crop, re-centering, and resizing to the original image size to delete any embedded textual information and enhance a region of interest.

Some embodiments use the hybrid classifier 1-6 as a supervised classifier for the covid-19 images. The neural network 1-1, also referred to as a representation generator, is trained without any labels using all the train data (13,942 samples). The state-of-the-art COVID-Net (Wang et al., 2020) was trained using oversampling to balance the training classes.

Embodiments balance the representations 1-2 before feeding to the classification model 1-4. In detail, in some embodiments, representations are balanced by downsampling "Normal" and "Pneumonia" classes and over-sampling the "covid-19" class so that the training size is kept constant while the difference in the sample sizes between classes is 1 or 2.

Example performance of the classifier 1-6 is now provided as a confusion matrix, see Table 2.

TABLE 2

| Confusion Matrix of hybrid classifier 1-6 | | | |
|---|---|---|---|
| Normal | 94 | 6 | 0 |
| Pneumonia | 7 | 92 | 1 |
| covid-19 | 3 | 2 | 95 |
| | Normal | Pneumonia | covid-19 |

Comparison to alternative benchmark classifiers is given in Table 3 for positive predictive value (PPV).

TABLE 3

| positive predictive value (PPV) | | | |
|---|---|---|---|
| Architecture | Normal | Pneumonia | covid-19 |
| VGG-19 | 83.1% | 75% | 98.4% |
| ResNet-50 | 88.2% | 86.8% | 98.8% |
| COVID-Net | 90.5% | 91.3% | 98.9% |
| hybrid classifier 1-6 | 90.4% | 92.0% | 99.0% |

Embodiments provide a total accuracy of 93:2%, the average class accuracy is 93:6%, and covid-19 accuracy is 95%. An example used here as a benchmark reports the average class accuracy as 93:3% and covid-19 accuracy as 91%. The benchmark is the paper by Linda Wang, Zhong Qiu Lin, and Alexander Wong, "Covid-net: A tailored deep convolutional neural network design for detection of covid-19 cases from chest x-ray images," *Scientific Reports*, 10(1): 1-12, 2020 (the "Covid-net Paper"). The quantitative evaluation of Table 3 shows that the hybrid classifier 1-6 outperforms the work reported in the Covid-net Paper.

Using the hybrid classifier 1-6, the COVID-19 accuracy is improved by 4% which is a significant improvement for medical diagnosis of a life-threatening virus.

The normalized positive predictive value (PPV) is laid out in Table 3 above, following the definition of PPV used in the Covid-net Paper.

The hybrid classifier 1-6 result outperforms all others in "Pneumonia" and "Covid" classes, see Table 3 above.

To show the benefit of the GP model 1-7 for imbalanced data, embodiments compare the hybrid classifier 1-6 with the NN softmax classifier with the same random samples selected from the training dataset. Embodiments use the same unsupervised representations 3-11 (associated with labelled data 1-21) as inputs to the two classifiers.

For the NN softmax classifier, the comparison benchmark AI function is constructed as a single fully-connected layer with a softmax activation function. The benchmark is trained for 700 epochs with an Adam optimizer.

The GP model 1-7, as a Bayesian method, is more data-efficient compared to the NN classifier for imbalanced data (see FIG. 9A and Table 4). Embodiments confirm that, when there are enough training samples (>10%) for the classifiers, GP classifiers show higher test accuracy (by about 1% to 2%) compared to the NN softmax classifiers.

TABLE 4

| Train | CNN (NN softmax classifier) | CNN-GP (hybrid classifier 1-6) |
|---|---|---|
| 10% | 83.36% +/13.6% | 83.34% +/− 2.95% |
| 20% | 86.13% +/− 1.93% | 87.65% +/− 1.80% |
| 30% | 87.20% +/− 0.62% | 89.33% +/− 0.61% |
| 40% | 88.23% +/− 1.67% | 89.60% +/− 0.91% |
| 50% | 87.94% +/− 0.0049% | 89.97% +/− 0.85% |

The GP classifier 1-7 shows more robust behavior and less fluctuations of accuracy than the NN softmax classifier (right-most column in Table 4).

Related to this performance, please see FIG. 9B. In FIG. 9B, the curves labelled 9-3, 9-4, 9-5 and 9-6 illustrate active learning results from different acquisition functions but from the same CNN-GP hybrid model. Entropy, Eq. 1 above, is an example of an acquisition function (curve 9-4). The three different acquisition functions have similar performance (9-4, 9-5 and 9-6). Curve 9-5 is an Average Variance ("AvgVar") acquisition function and curve 9-6 is an EnUnRank acquisition function. For more details of acquisition functions, see the Acquisition Function Usage Example Paper.

The 9-3 curve shows the results from random selection. Especially when the sample size is small (<20%), the training data selected by these three acquisition functions accelerates the model to reach significantly higher test accuracy. The remaining 90% of the data offer no new information to the classification model and can be auto-labeled by the hybrid classifier 1-6, saving considerable labeling cost. The acquisition model selects which unlabelled images to be labelled by ranking them and picking those with the highest ranking (most uncertainty).

Figure 5:
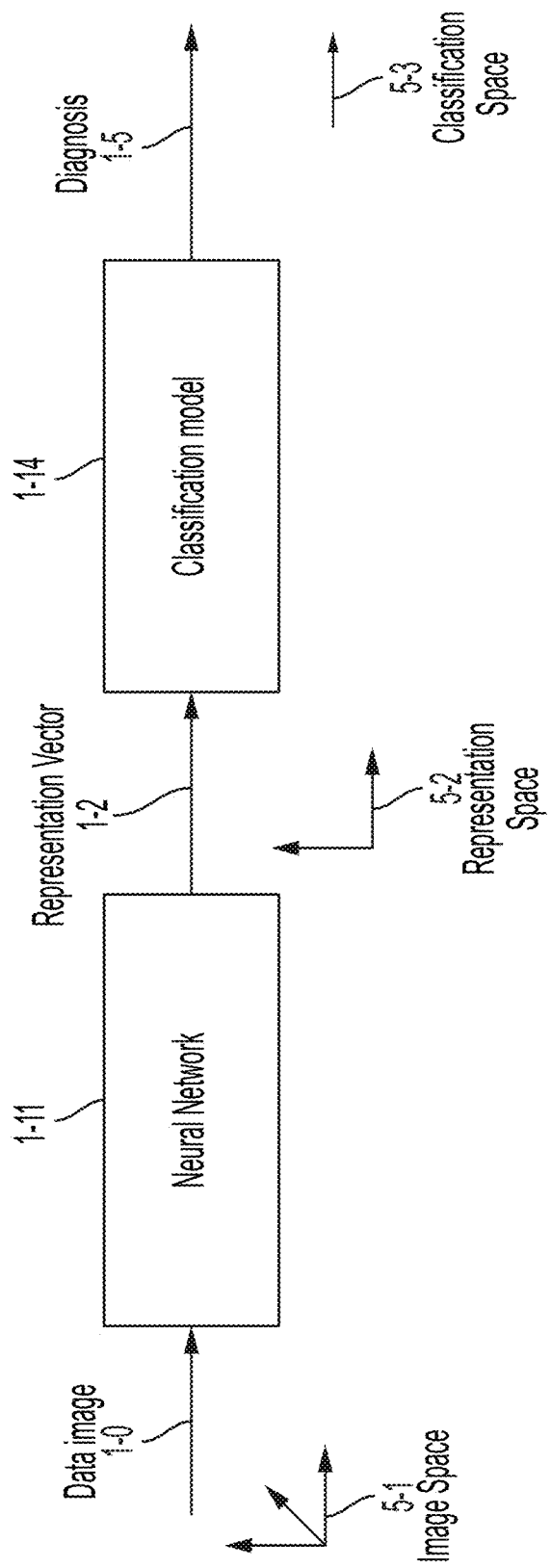
FIG. 5 illustrates a neural network 1-11 and classification model 1-4 and various input and output spaces, according to some embodiments.

FIG. 5 illustrates conceptually the reduction in degrees of freedom from the data image 1-0 to the diagnosis 1-5. FIG. 5 illustrates a neural network 1-11 and classification model 1-4 and various data spaces. The data image 1-0 is in an image space 5-1 which includes an x coordinate, a y-coordinate and a pixel intensity for each pair (x,y). The representation vector 1-2 is in a representation space 5-2, which includes a feature position and a feature value. The feature value may be a real number. The diagnosis 1-5 includes a diagnosis, for example one of three health classes (normal, pneumonia, covid-19) and uncertainty parameters such as variance.

FIG. 5 is a non-limiting example of degrees of freedom associated with the functions of the mapper classifier 1-107 of FIG. 1E.

Figure 6A:
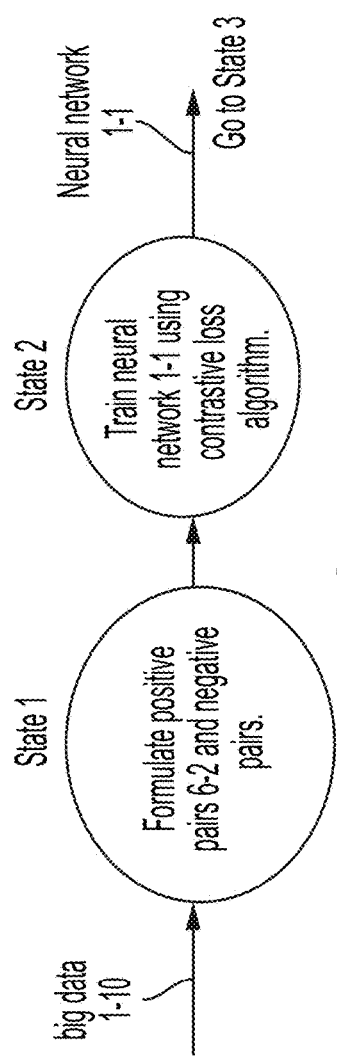
FIGS. 6A, 6B and 6C form a state diagram for training a neural network 1-1 on big data 1-10 which may be imbalanced, using active learning to retrain a classification model 1-4 and achieve data efficiency and applying the hybrid classifier 1-6 to obtain a diagnosis 1-5.
Figure 6B:
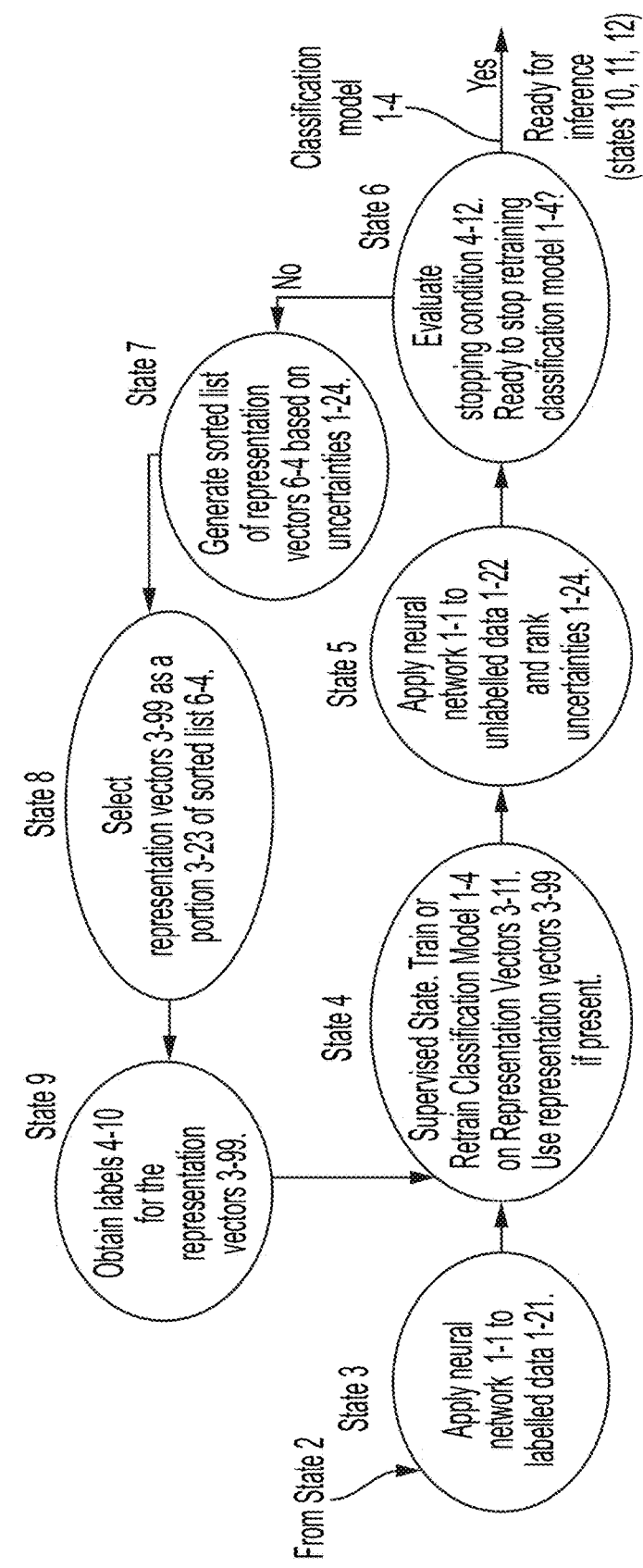
Figure 6C:
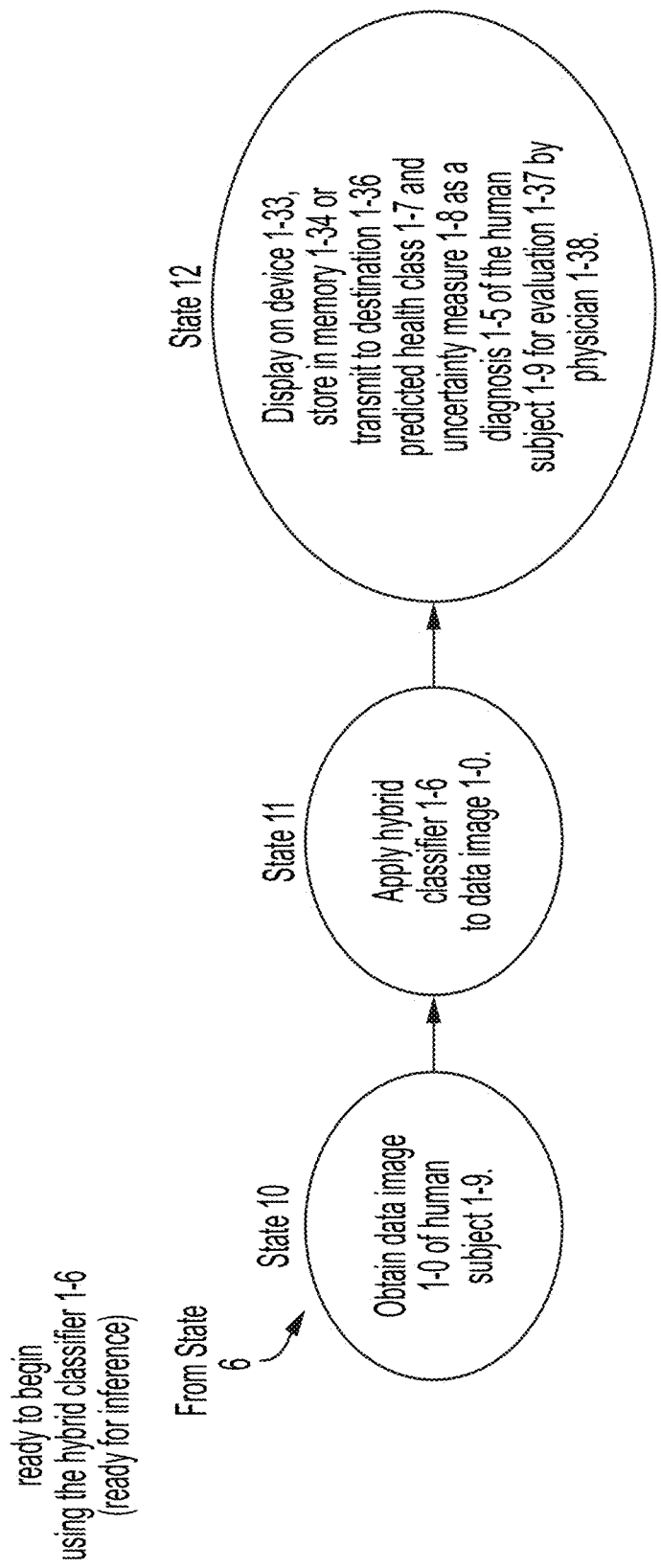

FIGS. 6A, 6B and 6C form a state diagram for training a neural network 1-1 on big data 1-10 which may be imbalanced, using active learning 1-12 to retrain a classification model 1-4, achieving data efficiency and applying the hybrid classifier 1-6 to obtain a diagnosis 1-5.

In FIG. 6A, the first state of the algorithm is reached by the arrival of the big data 1-10. In an embodiment, the SimCLR algorithm is initiated by forming positive pairs 6-2 and negative pairs 6-3. The algorithm moves to state 2, in which the neural network 1-1 is trained using the contrastive loss algorithm. State 2 is an unsupervised state. The neural network 1-1 is output and the algorithm moves to state 3. At state 3, the neural network is applied to labelled data 1-21 (or to a subset of 1-21). The representation vectors are now known (see third column of FIG. 11). State 4 is a supervised state. The classification model 1-4 is trained or retrained on representation vectors 3-11. Newly-labelled representation vectors 3-99 are used if present.

At state 5 the neural network 1-1 is applied to unlabelled data 1-22. Also, uncertainties 1-24 are ranked. At state 6, the algorithm evaluates a stopping condition 4-12. If the stopping condition is not satisfied, the algorithm moves to state 7, generates a sorted list of representation vectors 6-4 based on the ranking of uncertainties from state 5 and moves to state 6.

If the stopping condition 4-12 is satisfied at state 6, the classification model 1-4 is the output of state 6 and the algorithm is ready for inference, entering state 10.

Returning to the discussion of states 7 and 8, when the algorithm enters state 8, representation vectors 3-99 corresponding to a portion 3-23 of sorted list 6-4 are selected. From state 8, the algorithm moves to state 9. At state 9, labels 4-10 are associated with the representation vectors 3-99. Also see FIG. 11 and the annotation "3-20."

From state 9, the algorithm re-enters state 4, and supervised training is again performed as a part of active learning 1-12 to improve the classification model 1-4 using labelled representations, now including representation vectors 3-99.

From state 6 of FIG. 6B, the algorithm flows to state 10 of FIG. 6C. At state 10, a data image 1-0 is obtained of a human subject 1-9. Then, at state 11, the hybrid classifier 1-6 is applied to the data image 1-0. At state 12, a diagnosis 1-5 of the human subject 1-9 is output for evaluation 1-37 by a physician 1-38 or another medical person. The diagnosis 1-5 may be displayed on the display device 1-33, stored in the memory 1-34 or transmitted to the destination 1-36 using the communication network 1-35. The uncertainty measure 1-8 is useful because it tells the physician 1-38 the statistical confidence of the diagnosis 1-5.

FIGS. 6A, 6B and 6C are non-limiting example algorithm states corresponding to the mapper classifier system of FIG. 1-107.

Figure 7:
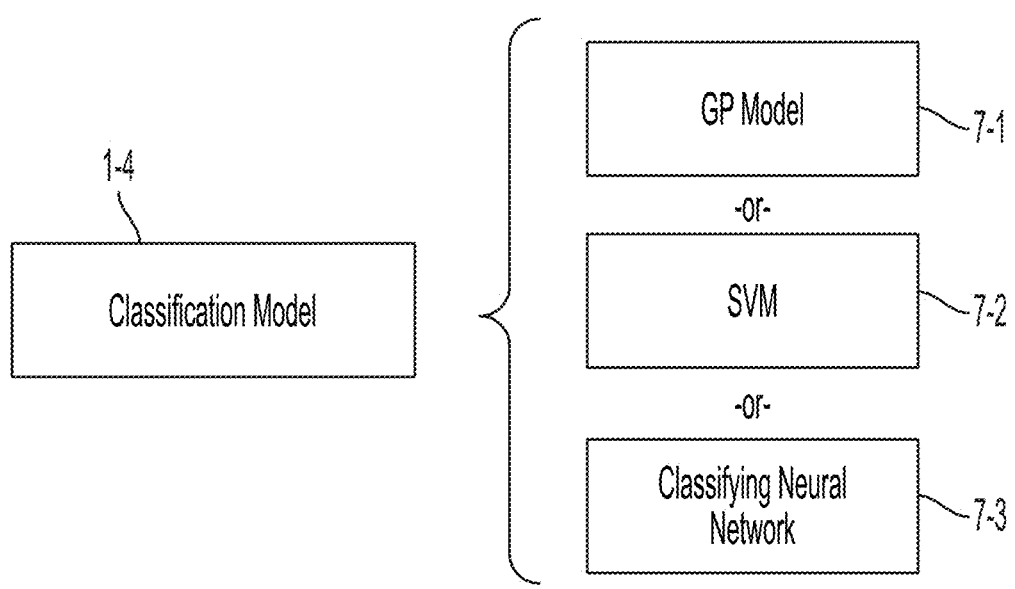
FIG. 7 illustrates various embodiments of a classification model.

FIG. 7 illustrates different embodiments of the classification model 1-4. The classification model 1-4 may be realized as a GP model 7-1. For example, see FIG. 4B.

In another embodiment, the classification model 1-4 is realized as a support vector machine, shown as SVM 7-2 in FIG. 7. For an example of SVM structure, see Majid Nour, Zafer Cömert, and Kemal Polat, "A novel medical diagnosis model for covid-19 infection detection based on deep features and bayesian optimization," *Applied Soft Computing*, 97:106580, 2020. ISSN 1568-4946. doi: https://doi.org/10.1016/j.asoc.2020.106580. URL http://www.sciencefirect.com/science/article/pii/S1568494620305184 ("the SVM Paper").

In yet another embodiment, the classification model 1-4 may be realized as a classifying neural network 7-3. For an example of building up a neural network to output a classification, see the Big Model Paper.

FIG. 7 is an example of classification models which can be used in the classifier 1-124 of FIG. 1E.

FIG. 8 illustrates examples of big data 1-10 and illustrates data imbalance 8-4. Example image 8-1 is a lung x-ray of person not suffering from pneumonia and not suffering from covid-19; this image is labelled as "normal." Example image 8-2 is a lung x-ray of person suffering from pneumonia; this image is labelled as "pneumonia." Example image 8-3 is a lung x-ray of person suffering from covid-19; this image is labelled as "covid-19."

The numbers of images indicated in FIG. 8 are subsets of big data 1-10. In an example, labelled data 1-21 includes the three sets of images indicated in FIG. 8; that is, in approximate terms, 8,000 images ("normal")+5,000 images ("pneumonia")+500 images (covid-19)=13,500 images, approximately. The small proportion of covid-19 images, 500 images, is indicated as data imbalance 8-4.

FIG. 8 is an example of big data 1-100 that can be used in the system 1-109 of FIG. 1E.

FIG. 9A illustrates improvement of accuracy parameterized by acquisition function with additional training data.

The type of performance for curve 9-15 in FIG. 9A corresponds to the embodiment shown in FIG. 4B which is a particular embodiment of FIG. 4A. Embodiments start with a small amount of labeled data (initial training dataset) to train the model in active learning, see 4-40. Then, embodiments use an acquisition function (often based on the prediction uncertainty or entropy, see Eq. 1) to evaluate the unlabeled pool dataset, see 4-43, choose the most helpful pooling samples, see 4-44, and ask the external oracle (generally a human) for the label, see 4-44.

Curve 9-13 is the softmax neural network using a random pick as the acquisition function. Curve 9-14 is the hybrid classifier 1-6 using a random pick as the acquisition function. Curve 9-15 is the hybrid classifier 1-6 using an Average Variance ("AvgVar") acquisition function. For AvgVar, for each image, the output is a probability which is a vector with the dimension of the number of classes and uncertainty of the probability which is also a vector with the dimension of the number of classes. The average variance is the class average of this uncertainty.

These newly labeled data are then added to the training dataset, see 4-45, to train an updated model with better performance, see 4-46. This process is repeated multiple times, see 1-12, with the train set gradually increasing in size over time until the model performance reaches a particular stopping criterion, see 4-27. Active learning is especially applicable in the medical field where data collection and labeling are quite expensive.

FIG. 9B illustrates improvement of accuracy with additional training data and comparison with a random benchmark, according to some embodiments. The acquisition function of the curve 9-3 corresponds to a random pick. Curve 9-4 uses the entropy acquisition function (Eq. 1). Curve 9-5 uses the AvgVar acquisition function with the hybrid classifier 1-6. Curve 9-6 uses the EnUnRank acquisition function with the hybrid classifier 1-6.

FIGS. 9A and 9B provide examples of performance that can be achieved by the mapper classifier 1-107 of FIG. 1E.

Figure 10:
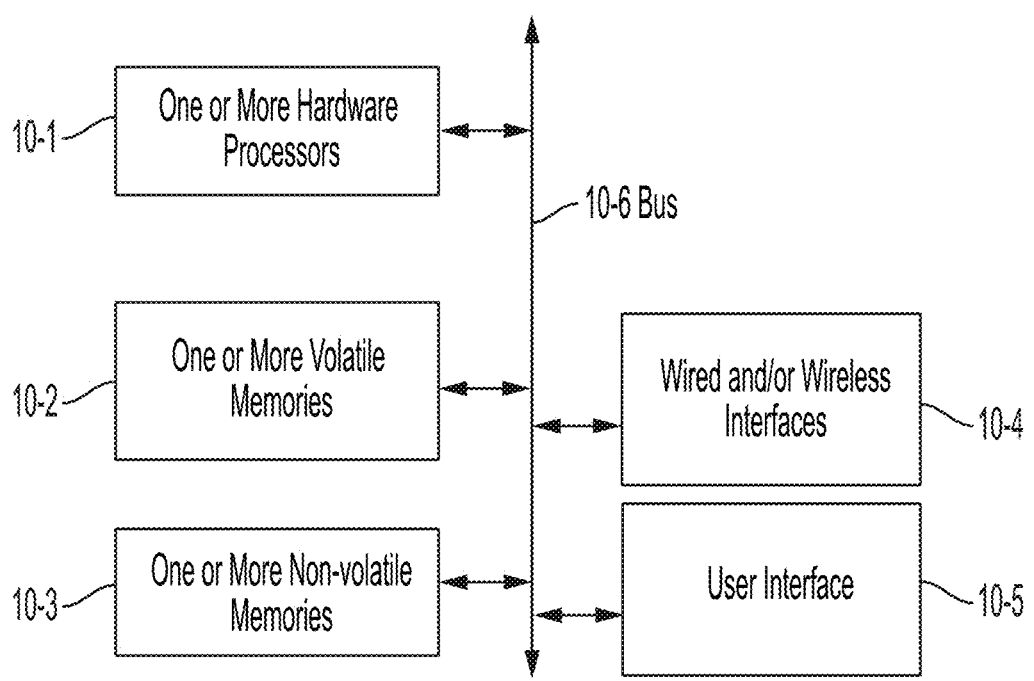
FIG. 10 illustrates an apparatus for implementing one or more of the embodiments, for example one or more of the processing entities of FIG. 1D.
Figure 12A:
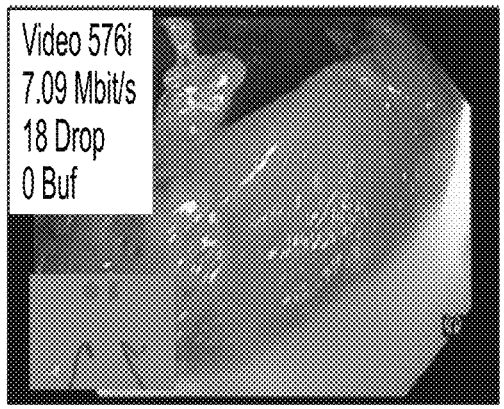
FIG. 12A, FIG. 12B, FIG. 12C, and FIG. 12D illustrate images from a large publicly available database related to the problem of determining bowel cleansing in preparation for colonoscopy.
Figure 12B:
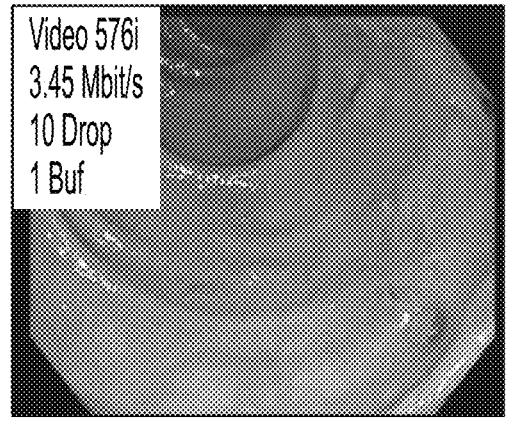
Figure 12C:
Figure 12D:
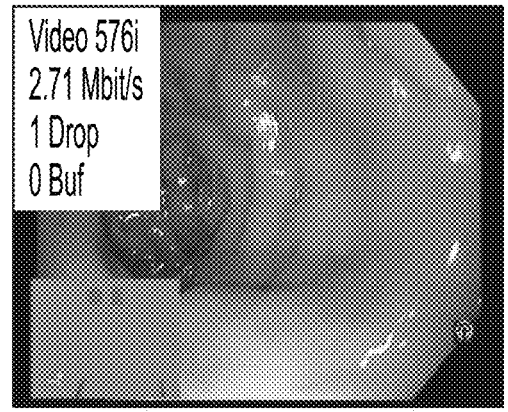

FIG. 10 illustrates an exemplary apparatus for implementation of the embodiments disclosed herein. The apparatus may be a server, a computer, a laptop computer, a handheld device, or a tablet computer device, for example. The apparatus may include one or more hardware processors 10-1. The one or more hardware processors 10-1 may include an ASIC (application specific integrated circuit), CPU (for example CISC or RISC device), and/or custom hardware. The apparatus also may include a user interface 10-5 (for example a display screen and/or keyboard and/or pointing device such as a mouse). The apparatus may include one or more volatile memories 10-2 and one or more non-volatile memories 10-3. The one or more non-volatile memories 10-3 may include a non-transitory computer readable medium storing instructions for execution by the one or more hardware processors 10-1 to cause the apparatus to perform any of the methods of embodiments disclosed herein.

FIG. 11 illustrates a data structure 11-1 for labelled data, unlabeled data, and newly-labelled data, according to some embodiments.

The example data structure is shown as a three by three matrix in FIG. 11 (heavy lines around the central three by three matrix). The rows are labelled on the left as first row, second row and third row. The columns are labelled on the top as first column, second column and third column. The nature of the data entry is marked across the top as data (for example, image data), label (for example, "normal," "pneumonia," "covid-19" or "no label"), and a corresponding representation vector 1-2 is stored in the third column. On the right, examples of a given row are given from the discussion in the application above.

FIG. 11 illustrates one embodiment for realization of the label association 3-20 of FIG. 3B. When a label is obtained at FIG. 4A 4-25, the previously unlabelled data of an entry in the second row becomes labelled, and that image/label/representation vector becomes associated with the third row. This is shown by the arrow marked 3-20 in the center area of the data structure 11-1 of FIG. 11.

The actual entries of each cell in 11-1 may be indices which are pointers to be used within memory spaces, one memory space for the data (first column, images) and another memory space for the representation vectors (third column).

The obtaining of a label (see line 3-20 in FIG. 11) of FIG. 11 is a non-limiting example of how the label acquirer 1-123 of FIG. 1E performs in the classification loop 1-120.

As mentioned above, provided herein is a method of processing of big data by a hybrid classifier 1-6 implemented on one or more processors (see FIG. 1D), the method comprising training the hybrid classifier on the big data, see 1-11 and 1-12, the training includes training a neural network, see 1-11, the training comprises unsupervised representation learning, see 1-11, and training a classification model using active learning and a first plurality of representation vectors, see 1-12, the first plurality of representation vectors is output by the neural network, see FIG. 1A;

obtaining a data image from a lung-imaging hardware apparatus, see FIG. 1D; classifying, using the hybrid classifier, the data image, see 1-31, to obtain a diagnosis 1-5; and sending the diagnosis to a display hardware device 1-33 for evaluation by a physician or a similar medical person.

In some embodiments of the method, the classification model is a Gaussian process model (GP model), see FIG. 4B.

In some embodiments of the method, the classification model is a support vector machine (SVM), see FIG. 7.

In some embodiments of the method, the classification model is a classifying neural network, see FIG. 7.

In some embodiments of the method, the active learning is based on a plurality of uncertainties, see 4-22 and 4-43 estimated by the classification model acting on a second plurality of representations (e.g., pool set), the first plurality of representation vectors includes the second plurality of representations, and the second plurality of representations are not associated with labeled data, see 1-22.

In some embodiments of the method, the training the hybrid classifier comprises training the neural network based on the big data, the big data includes a first set of images, the neural network is configured to provide a first feature vector in response to a first image, and the training the neural network is performed without a use of any label information of the first set of images, see second row of 11-1 in FIG. 11.

In some embodiments of the method, the training the hybrid classifier comprises training the classification model using a second set of labeled data, see 1-21, 4-42 and 4-21.

In some embodiments of the method, the training the hybrid classifier comprises predicting a plurality of classifications using the classification model applied to a third set of unlabeled data and a plurality of uncertainties, each classification of the plurality of classifications corresponding to respective ones of the plurality of uncertainties, see FIG. 6B the sequence . . . state 6, state 7, state 8, state 9, state 4, state 5.

In some embodiments of the method, the training the hybrid classifier comprises sorting the third set of unlabeled data according to a ranking process of the plurality of uncertainties to obtain a ranking list.

In some embodiments of the method, the training the hybrid classifier comprises selecting a portion of the third set of unlabeled data, the portion is associated with first uncertainties as indicated by the ranking, the first uncertainties are determined by a threshold being exceeded or by being a fixed chunk of the third set of unlabeled data, see 4-24.

In some embodiments of the method, the method includes obtaining labels for the portion to produce a fourth set of labeled data, see 4-24 and 4-44.

In some embodiments of the method, the obtaining labels comprises obtaining labels from a human.

In some embodiments of the method, the method includes forming a fifth set of labeled data, the fifth set of labeled data includes the fourth set of labeled data and the second set of labeled data, see 3-22.

In some embodiments of the method, the training the hybrid classifier comprises iteratively retraining the classification model based on newly labeled portions of the third set of unlabeled data until a stopping condition is reached, see 1-12, 4-27, and 4-29.

In some embodiments of the method, the classifying the data image comprises: obtaining, based on the data image, a data representation vector in a representation vector space; predicting, using the classification model based on the data representation vector, a predicted health class, see FIG. 5; and outputting the predicted health class and an uncertainty measure associated with a function evaluation of the classification model at the data representation vector, see result of FIGS. 1A, 1B, 1D, 4A, 5, and 6C, the predicted health class and the uncertainty measure are then associated as the diagnosis with a human subject.

In some embodiments of the method, the classifying selects from a plurality of health classes, and a disease of the plurality of health classes is covid-19, see FIG. 8.

In some embodiments of the method, the classifying selects from a plurality of health classes, and the plurality of health classes comprises labels corresponding to normal, pneumonia and covid-19, see FIG. 8.

In some embodiments of the method, the training the classification model comprises evaluating a kernel function for a first training representation vector and a second training representation vector, the kernel function provides a measure of distance between the first training representation vector and the second training representation vector, see FIG. 4B and notation to 7-1.

An apparatus is also disclosed, the apparatus configured to perform the method, see FIG. 1D, FIG. 4B, and FIG. 10.

A non-transitory computer readable medium (CRM) is also disclosed, the non-transitory CRM storing instructions, the instructions configured to cause one or more apparatuses to perform the method, see FIG. 1D.

In some embodiments of the method, the kernel function is radial basis function (RBF).

In some embodiments of the method, the training the classification model comprises performance of a stochastic variational inference (SVI) algorithm.

In some embodiments of the method, to first set of unlabeled representation vectors corresponds to a first set of unlabeled images, and the first set of unlabeled images is a pool set, see 4-43.

In some embodiments of the method, the predicting comprises inputting a first set of unlabeled images into the neural network to obtain a first set of unlabeled representation vectors, see 3-12.

In some embodiments of the method, the method further comprises ranking a plurality of uncertainties from high to low; and obtaining a set of additional labels for a predetermined number of representation vectors among the first set of unlabeled representation vectors, the predetermined number of representation vectors correspond to predicted classifications with a high uncertainty, see 4-23 and 4-44.

In some embodiments of the method, the obtaining the set of additional labels comprises presenting the predetermined number of representation vectors to a human being for classification.

In some embodiments of the method, the big data includes at least 1,000 images, see FIG. 8.

In some embodiments of the method, the classification model is a kernel classification model.

In some embodiments of the method, the method further comprises treating a person for a covid-19 virus infection, the data image is associated with the person, and the treating comprises quarantining the person for a public-health determined quarantine period or administration of a therapeutic drug to the person to combat the covid-19 virus infection.

Also provided is a second method, the second method being a method of disease classification using a hybrid of a neural network and a classification model, a data image is obtained from a human subject for a purpose of health diagnosis, the second method comprising: training the neural network based on a first set of images, the neural network is configured to provide a first representation vector of a representation vector space in response to a first image, and the training the neural network is performed without a use of any label information of the first set of images; training the classification model using a second set of labeled train data; predicting a plurality of classifications using the classification model applied to a third set of unlabeled data; iteratively retraining the classification model based on newly labeled portions of the third set of unlabeled data until a stopping condition is reached; classifying a data image using the neural network and the classification model, the classifying comprises: obtaining, based on the data image, a data representation vector in the representation vector space; predicting, using the classification model based on the data representation vector, a predicted health class; and outputting the predicted health class and an uncertainty measure associated with an evaluation of the classification model at the data representation vector, the predicted health class and the uncertainty measure are then associated as a diagnosis with the human subject.

Also provided is a second apparatus, the second apparatus being for processing of big data to train a hybrid classifier (see FIG. 1B and description and FIG. 10 and description), the second apparatus comprising: a training means for training (see FIG. 1B) the hybrid classifier on the big data, the training includes: training a neural network, the training comprises unsupervised representation learning, and training a classification means using active learning and a first plurality of representation vectors (see FIG. 7 and description), the first plurality of representation vectors is output by the neural network; the hybrid classifier is configured to classify data to obtain a crystallization and output the crystallization. The data is not limited to lung images and may be from applications involving, for example, The data 1-90 may be from applications including, as non-limiting examples, physics, neurobiology, signal processing, communications, robotic navigation, autonomous vehicles, tactile feedback and/or scene recognition. The second apparatus is configured to output the crystallization by operations comprising: applying the neural network to the data image to obtain a representation vector, applying the classification means to the representation vector to obtain the crystallization, and sending the crystallization to a display hardware device for evaluation by a person.

What is claimed is:

1. An apparatus for processing of big data to train a hybrid classifier, the apparatus comprising:
    a training means for training the hybrid classifier on the big data, wherein the training comprises:
        training a neural network, wherein the training comprises unsupervised representation learning, and
        training a classification means using active learning and a first plurality of representation vectors, wherein the first plurality of representation vectors is output by the neural network;
    wherein the hybrid classifier is configured to classify a data image to obtain a crystallization and output the crystallization by operations comprising:
        applying the neural network to the data image to obtain a representation vector,
        applying the classification means to the representation vector to obtain the crystallization, and
        sending the crystallization to a display hardware device for evaluation by a person, wherein the crystallization is at least a probability vector,
    wherein the unsupervised representation learning uses unsupervised contrastive learning based on a contrastive loss, and
    wherein the active learning is based on a plurality of uncertainties estimated by the classification means acting on a second plurality of representations, wherein the first plurality of representation vectors includes the second plurality of representations, and the second plurality of representations are not associated with labeled data.

2. The apparatus of claim 1, wherein entries of the probability vector are associated in a one to one manner with entries of a label vector.

3. The apparatus of claim 2, wherein an entry of the label vector is associated with a lung illness.

4. The apparatus of claim 3, wherein the lung illness is covid-19.

5. The apparatus of claim 2, wherein an entry of the label vector is associated with classification of bowel cleansing.

6. The apparatus of claim 2, wherein an entry of the label vector is associated with identification of objects such as airplanes, automobiles, birds, cats, deer, dogs, frogs, horses, ships or trucks.

7. The apparatus of claim 2, wherein an entry of the label vector is associated with images of the human eye.

8. The apparatus of claim 2, wherein a number of classes corresponding to a length of the probability vector is 2.

9. The apparatus of claim 2, wherein a number of classes corresponding to a length of the probability vector is 3.

10. The apparatus of claim 2, wherein a number of classes corresponding to a length of the probability vector is 4.

11. A method of processing of big data by a hybrid classifier implemented on one or more processors, the method comprising:
    training the hybrid classifier on the big data, wherein the training comprises:
        training a neural network, wherein the training comprises unsupervised representation learning, and
        training a classification model using active learning and a first plurality of representation vectors, wherein the first plurality of representation vectors is output by the neural network;
    obtaining a data image from a lung-imaging hardware apparatus;
    classifying, using the hybrid classifier, the data image to obtain a diagnosis; and
    sending the diagnosis to a display hardware device for evaluation by a physician,
    wherein the unsupervised representation learning uses unsupervised contrastive learning based on a contrastive loss, and
    wherein the active learning is based on a plurality of uncertainties estimated by the classification model acting on a second plurality of representations, wherein the first plurality of representation vectors includes the second plurality of representations, and the second plurality of representations are not associated with labeled data.

12. The method of claim 11, wherein the classification model is a Gaussian process model (GP model).

13. The method of claim 12, wherein the training the hybrid classifier comprises training the classification model using a second set of labeled data.

14. The method of claim 13, wherein the training the hybrid classifier comprises predicting a plurality of classifications using the classification model applied to a third set of unlabeled data and a plurality of uncertainties, each classification of the plurality of classifications corresponding to respective ones of the plurality of uncertainties.

15. The method of claim 14, wherein the training the hybrid classifier comprises sorting the third set of unlabeled data according to a ranking process of the plurality of uncertainties to obtain a ranking list.

16. The method of claim 11, wherein the classification model is a support vector machine (SVM).

17. The method of claim 11, wherein the classification model is a classifying neural network.

18. A method of processing of big data by a hybrid classifier implemented on one or more processors, the method comprising:
training the hybrid classifier on the big data, wherein the training comprises:
training a neural network, wherein the training comprises unsupervised representation learning, and
training a classification model using active learning and a first plurality of representation vectors, wherein the first plurality of representation vectors is output by the neural network;
obtaining a data image from a lung-imaging hardware apparatus;
classifying, using the hybrid classifier, the data image to obtain a diagnosis; and
sending the diagnosis to a display hardware device for evaluation by a physician,
wherein the unsupervised representation learning uses unsupervised contrastive learning based on a contrastive loss wherein the training the hybrid classifier comprises training the neural network based on the big data, wherein the big data includes a first set of images, wherein the neural network is configured to provide a first feature vector in response to a first image, and wherein the training the neural network is performed without a use of any label information of the first set of images.

19. A non-transitory computer readable medium storing instructions, the instructions configured to cause one or more apparatuses to perform a method comprising:
training a hybrid classifier on big data, wherein the training comprises:
training a neural network, wherein the training comprises unsupervised representation learning, and
training a classification model using active learning and a first plurality of representation vectors, wherein the first plurality of representation vectors is output by the neural network;
obtaining a data image from a lung-imaging hardware apparatus;
classifying, using the hybrid classifier, the data image to obtain a diagnosis; and
sending the diagnosis to a display hardware device for evaluation by a physician,
wherein the unsupervised representation learning uses unsupervised contrastive learning based on a contrastive loss, and
wherein the active learning is based on a plurality of uncertainties estimated by the classification model acting on a second plurality of representations, wherein the first plurality of representation vectors includes the second plurality of representations, and the second plurality of representations are not associated with labeled data.

* * * * *